United States Patent
Kim et al.

(10) Patent No.: US 12,256,458 B2
(45) Date of Patent: Mar. 18, 2025

(54) METHOD AND APPARATUS FOR SMALL DATA TRANSMISSION IN RRC INACTIVE STATE IN MR-DC

(71) Applicant: LG ELECTRONICS INC., Seoul (KR)

(72) Inventors: Seokjung Kim, Seoul (KR); Jian Xu, Seoul (KR); Daewook Byun, Seoul (KR)

(73) Assignee: LG ELECTRONICS INC., Seoul (KR)

(*) Notice: Subject to any disclaimer, the term of this patent is extended or adjusted under 35 U.S.C. 154(b) by 414 days.

(21) Appl. No.: 17/797,596

(22) PCT Filed: Jan. 14, 2021

(86) PCT No.: PCT/KR2021/000541
§ 371 (c)(1),
(2) Date: Aug. 4, 2022

(87) PCT Pub. No.: WO2021/157895
PCT Pub. Date: Aug. 12, 2021

(65) Prior Publication Data
US 2023/0067158 A1   Mar. 2, 2023

(30) Foreign Application Priority Data
Feb. 7, 2020 (KR) .................. 10-2020-0015127

(51) Int. Cl.
*H04W 76/27* (2018.01)
*H04W 28/06* (2009.01)
*H04W 76/16* (2018.01)

(52) U.S. Cl.
CPC .......... *H04W 76/27* (2018.02); *H04W 28/06* (2013.01); *H04W 76/16* (2018.02)

(58) Field of Classification Search
None
See application file for complete search history.

(56) References Cited

U.S. PATENT DOCUMENTS

| | | | |
|---|---|---|---|
| 6,381,228 B1 * | 4/2002 | Prieto, Jr. ........... | H04B 7/2123 370/444 |
| 10,141,983 B2 | 11/2018 | Kim et al. | |

(Continued)

FOREIGN PATENT DOCUMENTS

| | | |
|---|---|---|
| KR | 102053229 | 12/2019 |
| WO | 2019202451 | 10/2019 |
| WO | 2020005470 | 1/2020 |

OTHER PUBLICATIONS

Qualcomm Incorporated, Introduce MO EDT for User Plane CIoT 5GS Optimisation, S2-1909908, 3GPP TSG-SA WG2 Meeting #135, Split, Croatia, Oct. 4, 2019, section 4.8.2.X, 36 Pages.

(Continued)

*Primary Examiner* — Lonnie V Sweet
(74) *Attorney, Agent, or Firm* — BRYAN CAVE LEIGHTON PAISNER LLP

(57) ABSTRACT

A method and apparatus for small data transmission in RRC inactive state in MR-DC is provided. A MN, in a DC for a wireless device, transmits, to the wireless device, a paging message including an indication related to an EDT procedure for the SN. A MN receives, from the wireless device, an AS-RAI related to the EDT procedure for SN. A MN decides whether to continue the EDT procedure to the wireless device for the DL data or to transit the wireless device to the RRC-CONNECTED state based on the received AS-RAI.

20 Claims, 18 Drawing Sheets

(56) References Cited

U.S. PATENT DOCUMENTS

| | | | |
|---|---|---|---|
| 10,278,126 | B2 | 4/2019 | Hong |
| 10,638,253 | B1 | 4/2020 | Parkvall et al. |
| 11,917,579 | B2* | 2/2024 | Jia .................. H04W 68/02 |
| 2016/0374048 | A1* | 12/2016 | Griot ................ H04W 4/70 |
| 2020/0170071 | A1* | 5/2020 | Mildh ................ H04W 80/08 |
| 2020/0214073 | A1* | 7/2020 | Shimoda ............ H04W 76/15 |
| 2021/0212131 | A1* | 7/2021 | Futaki .............. H04W 8/24 |
| 2021/0315050 | A1* | 10/2021 | Rönneke ............ H04W 76/27 |
| 2021/0400630 | A1* | 12/2021 | Shi ................. H04W 8/205 |
| 2022/0015181 | A1* | 1/2022 | Rönneke ............ H04W 76/27 |
| 2022/0279395 | A1* | 9/2022 | Zirwas ............. H04L 5/0098 |
| 2024/0172176 | A1* | 5/2024 | Wu .................. H04W 68/02 |

OTHER PUBLICATIONS

LG Electronics Inc., Discussion on open issues for MT-EDT, R3-194358, 3GPP TSG-RAN WG3 #105, Ljubljana, Slovenia, Aug. 16, 2019, sections 2.1-2.2, 8 Pages.

Section 4 of 3GPP TS 37.340 V15.3.0, Sep. 2018, 59 Pages.

Section 10.12.2 of 3GPP TS 37.340 v16.0.0, Dec. 2019, 72 Pages.

* cited by examiner

METHOD AND APPARATUS FOR SMALL DATA TRANSMISSION IN RRC INACTIVE STATE IN MR-DC

This application is the National Stage filing under 35 U.S.C. 371 of International Application No. PCT/KR2021/000541 filed on Jan. 14, 2021, which claims priority to Korean Patent Application No. 10-2020-0015127 filed on Feb. 7, 2020, the contents of which are all hereby incorporated by reference herein in their entirety.

BACKGROUND

Technical Field

The present disclosure relates to a method and apparatus for small data transmission in RRC inactive state in Multi-Radio Access Technology (RAT)-Dual Connectivity (MR-DC).

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

SUMMARY

Technical Objects

In NR, small data transmission in RRC-INACTIVE state could be supported. For example, context fetch and data forwarding (with and without anchor relocation) in inactive state could be supported.

However, the mechanisms to deliver the UP data between the MN and SN in MR-DC without a state transition to RRC-CONNECTED state.

Therefore, studies for small data transmission in RRC inactive state in MR-DC in a wireless communication system are needed.

Technical Solutions

In an aspect, a method performed by a Master Node (MN) in a Dual Connectivity (DC) for a wireless device in a wireless communication system is provided. A MN transmits, to the wireless device, a paging message including an indication related to an Early Data Transmission (EDT) procedure for the SN. A MN receives, from the wireless device, an Access Stratum-Release Assistance Information (AS-RAI) related to the EDT procedure for SN. A MN decides whether to continue the EDT procedure to the wireless device for the DL data or to transit the wireless device to the RRC-CONNECTED state based on the received AS-RAI.

In another aspect, an apparatus for implementing the above method is provided.

Technical Effects

The present disclosure may have various advantageous effects.

According to some embodiments of the present disclosure, a master node (MN) and a secondary node (SN) could efficiently perform small data transmission in RRC inactive state in MR-DC.

According to some embodiments of the present disclosure, since the MN needs not to re-establish or resume the lower layers at SN to forward the small data, the wireless device may not need to perform state transition to RRC-CONNECTED state.

For example, the small data can be quickly forwarded to the wireless device for Downlink (DL) or 5GC for Uplink (UL).

According to some embodiments of the present disclosure, the MN needs not to re-establish or resume the lower layers at SN to forward the small data, thus resulting in no UE's state transition to RRC-CONNECTED.

For example, it may need not to trigger the Activity Notification procedure by the SN to notify the MN about user data activity for SN terminated bearers. Since the DL data is sent to the MN via the SN, the small data can be quickly forwarded to a wireless device for DL or 5GC for UL.

According to some embodiments of the present disclosure, a wireless communication system could provide an efficient solution for small data transmission in RRC inactive state in MR-DC.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
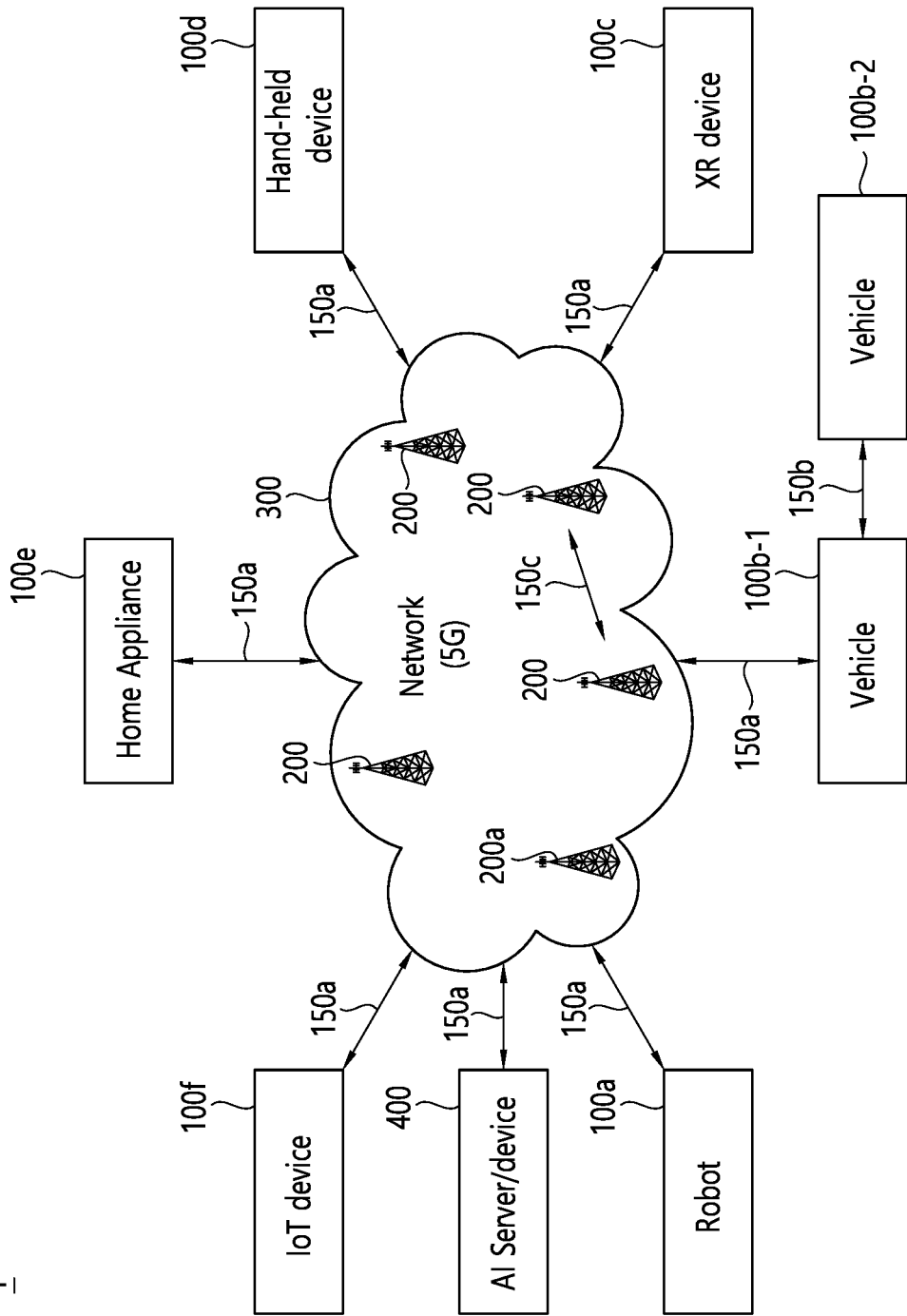
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
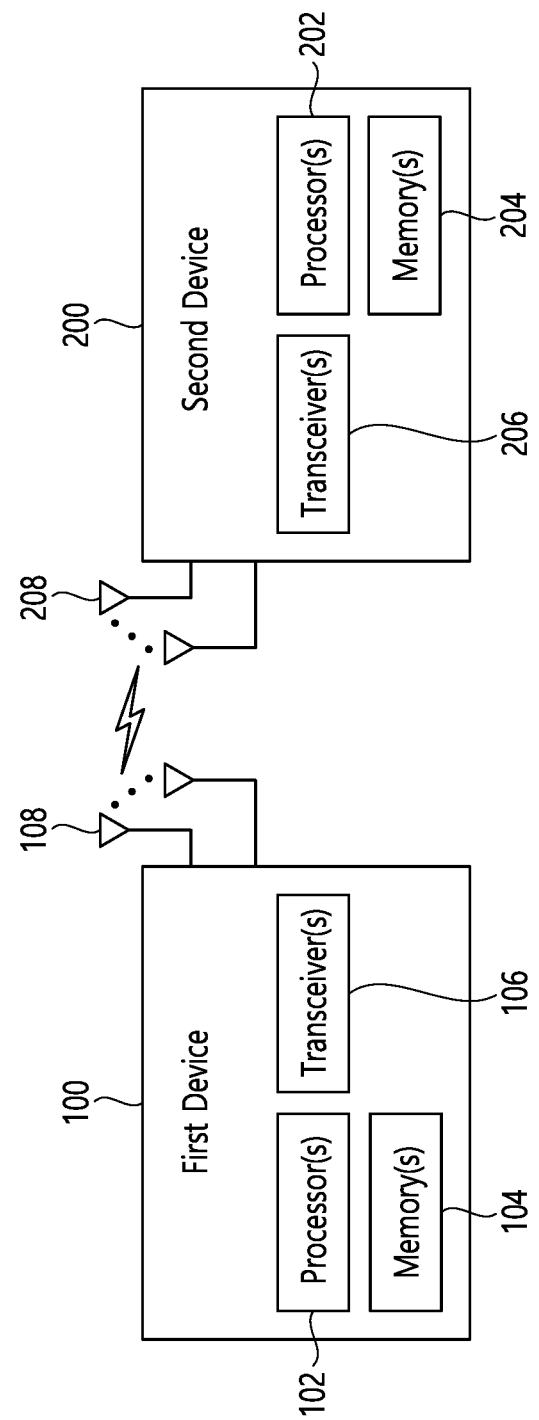
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
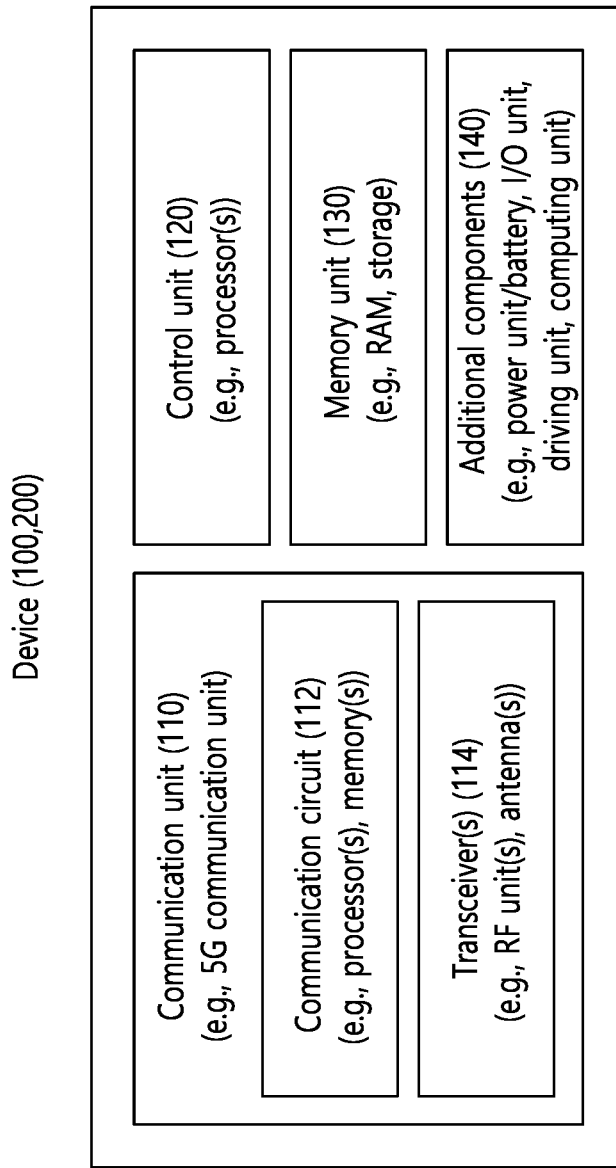
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
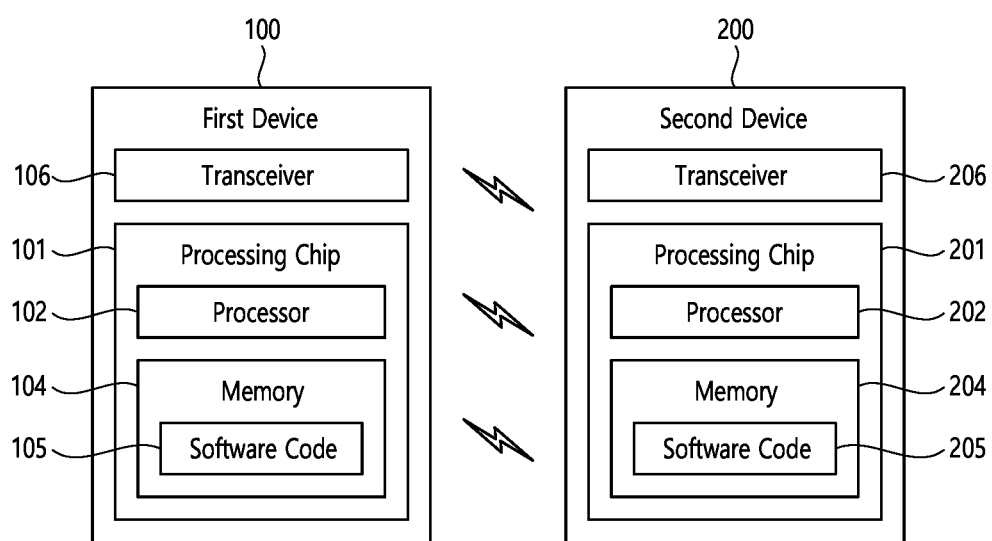
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such as a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
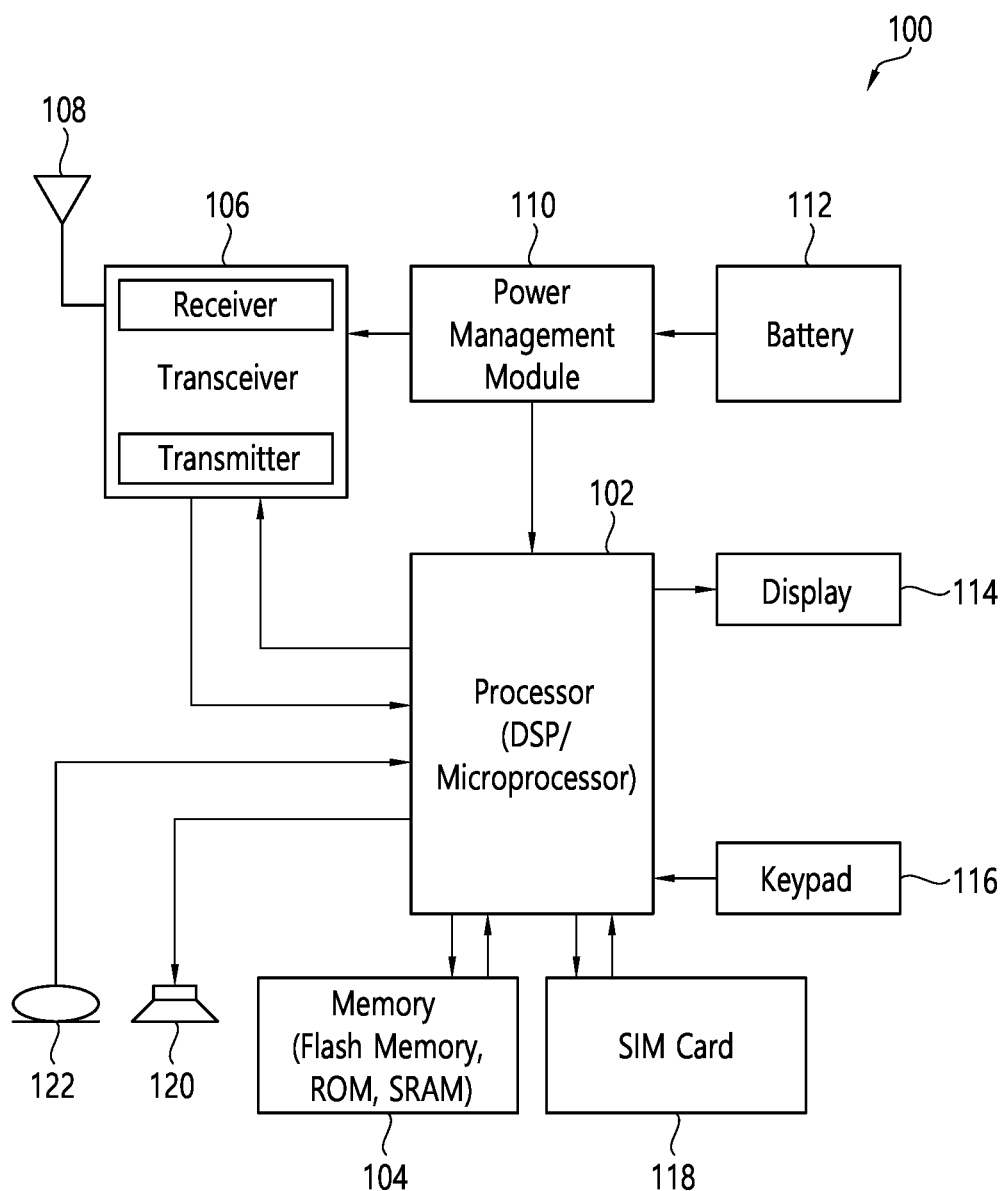
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
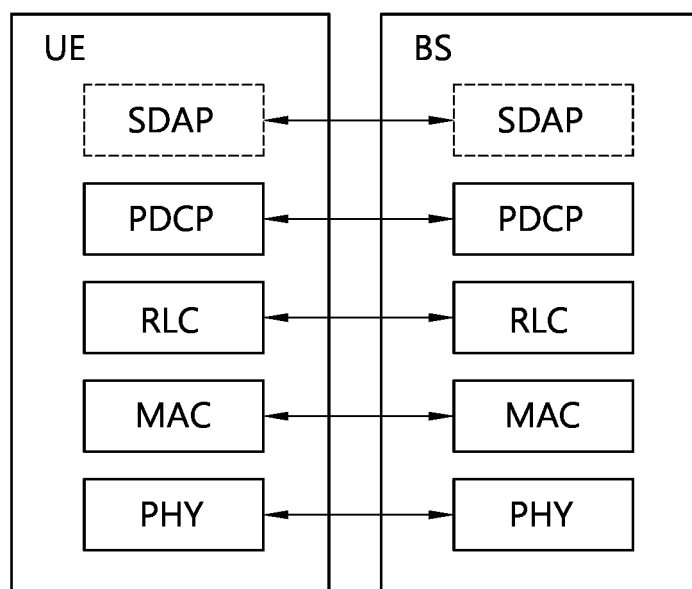
FIGS. 6 and 7 show an example of protocol stacks in a 3GPP based wireless communication system to which implementations of the present disclosure is applied.
Figure 7:
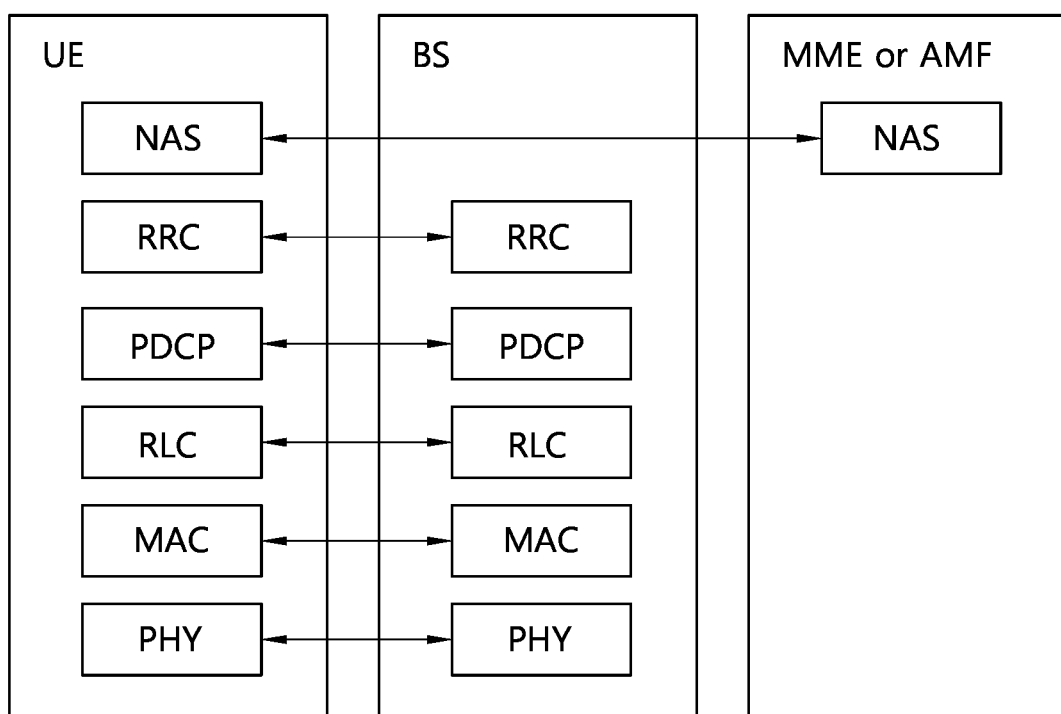

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
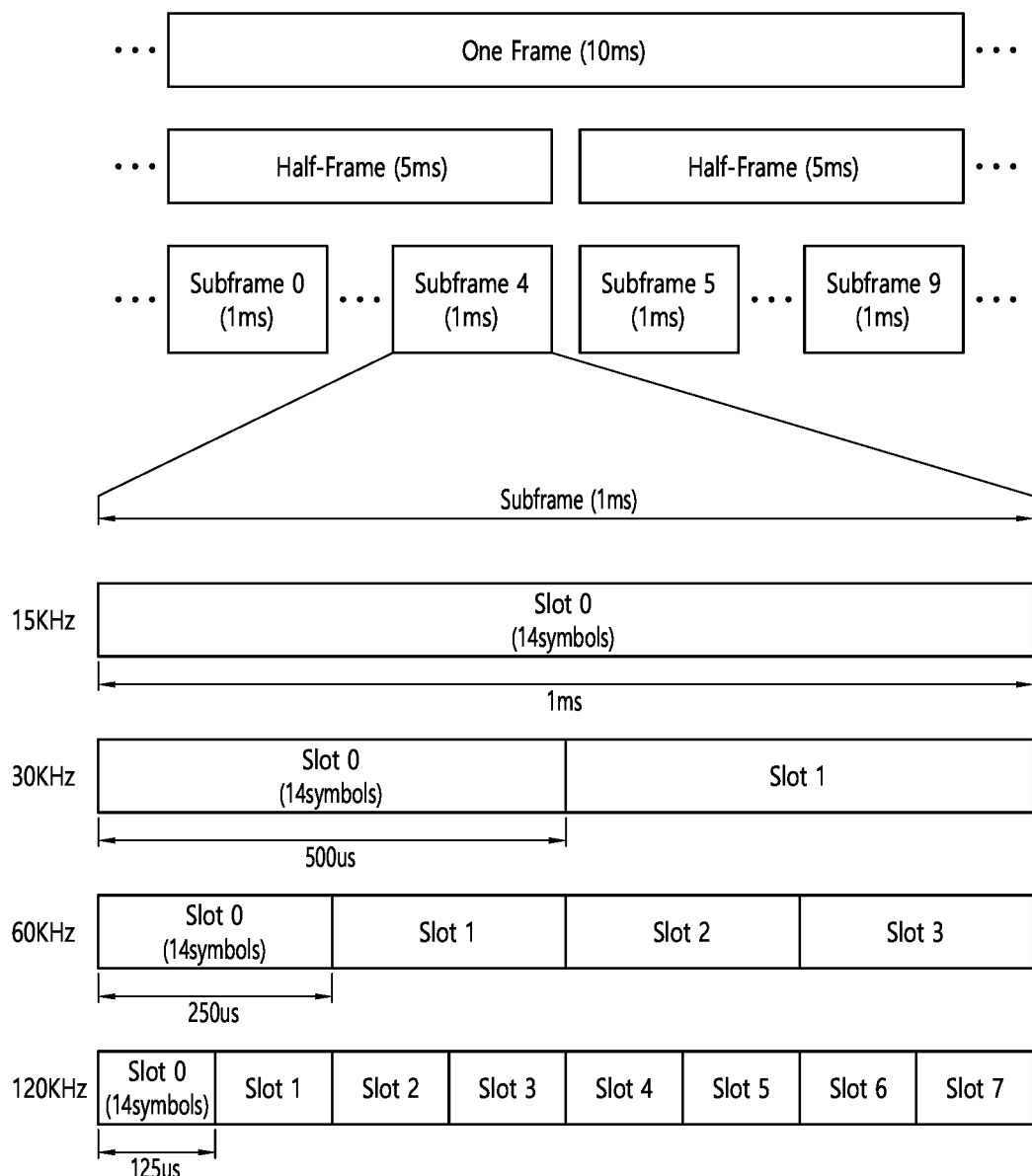
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f=10$ ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2^u*15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f=2^u*15$ kHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f=2^u*15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x} * N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
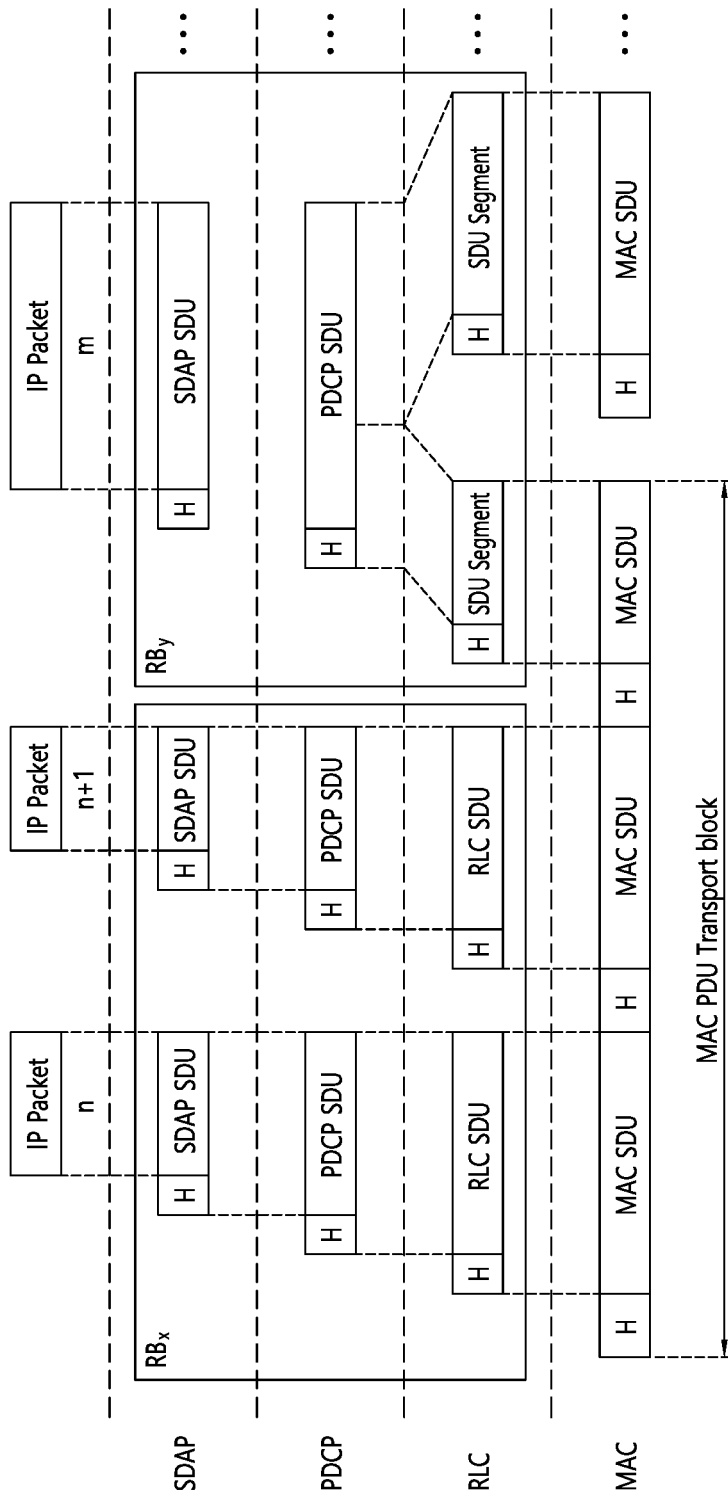
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Figure 10:
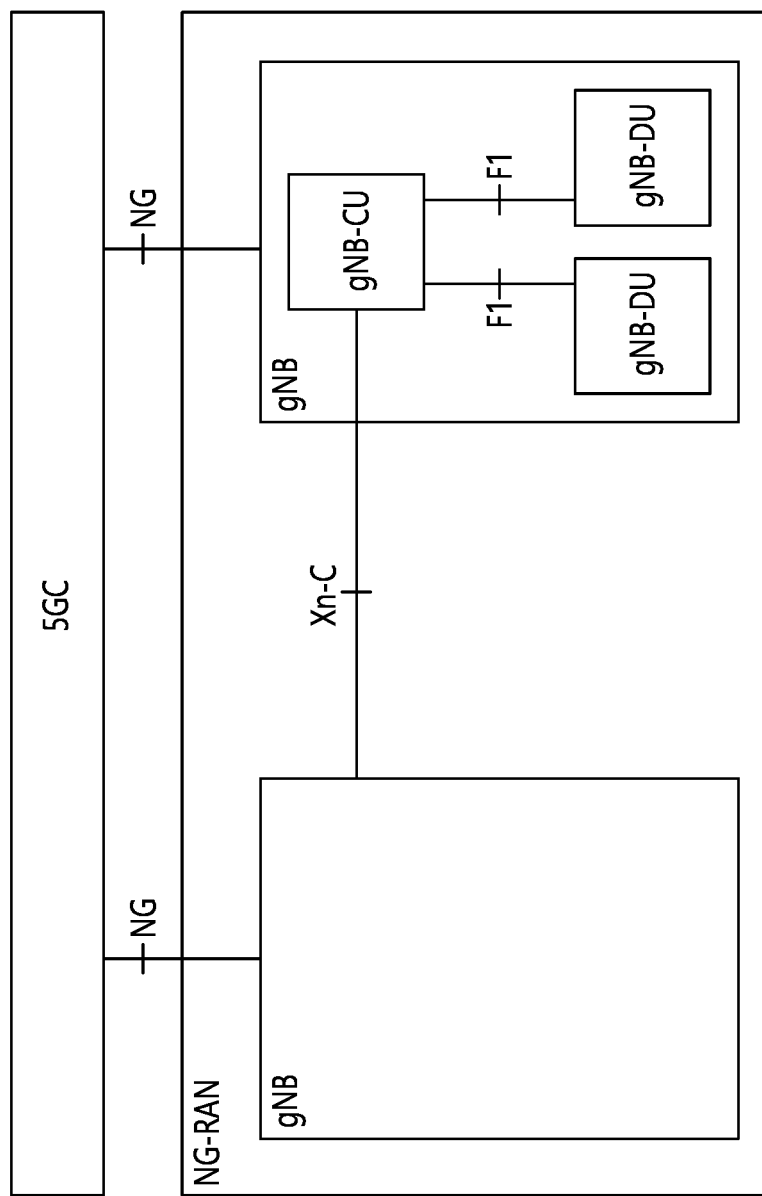
FIG. 10 shows an example of the overall architecture of an NG-RAN to which technical features of the present disclosure can be applied.

FIG. 10 shows an example of the overall architecture of an NG-RAN to which technical features of the present disclosure can be applied.

Referring to FIG. 10, a gNB may include a gNB-CU (hereinafter, gNB-CU may be simply referred to as CU) and at least one gNB-DU (hereinafter, gNB-DU may be simply referred to as DU).

The gNB-CU is a logical node hosting RRC, SDAP and PDCP protocols of the gNB or an RRC and PDCP protocols of the en-gNB. The gNB-CU controls the operation of the at least one gNB-DU.

The gNB-DU is a logical node hosting RLC, MAC, and physical layers of the gNB or the en-gNB. The operation of the gNB-DU is partly controlled by the gNB-CU. One gNB-DU supports one or multiple cells. One cell is supported by only one gNB-DU.

The gNB-CU and gNB-DU are connected via an F1 interface. The gNB-CU terminates the F1 interface connected to the gNB-DU. The gNB-DU terminates the F1 interface connected to the gNB-CU. One gNB-DU is connected to only one gNB-CU. However, the gNB-DU may be connected to multiple gNB-CUs by appropriate implementation. The F1 interface is a logical interface. For NG-RAN, the NG and Xn-C interfaces for a gNB consisting of a gNB-CU and gNB-DUs, terminate in the gNB-CU. For E-UTRAN-NR dual connectivity (EN-DC), the S1-U and X2-C interfaces for a gNB consisting of a gNB-CU and gNB-DUs, terminate in the gNB-CU. The gNB-CU and connected gNB-DUs are only visible to other gNBs and the 5GC as a gNB.

Functions of the F1 interface includes F1 control (F1-C) functions as follows.

(1) F1 Interface Management Function

The error indication function is used by the gNB-DU or gNB-CU to indicate to the gNB-CU or gNB-DU that an error has occurred.

The reset function is used to initialize the peer entity after node setup and after a failure event occurred. This procedure can be used by both the gNB-DU and the gNB-CU.

The F1 setup function allows to exchange application level data needed for the gNB-DU and gNB-CU to interoperate correctly on the F1 interface. The F1 setup is initiated by the gNB-DU.

The gNB-CU configuration update and gNB-DU configuration update functions allow to update application level configuration data needed between gNB-CU and gNB-DU to interoperate correctly over the F1 interface, and may activate or deactivate cells.

The F1 setup and gNB-DU configuration update functions allow to inform the single network slice selection assistance information (S-NSSAI) supported by the gNB-DU.

The F1 resource coordination function is used to transfer information about frequency resource sharing between gNB-CU and gNB-DU.

(2) System Information Management Function

Scheduling of system broadcast information is carried out in the gNB-DU. The gNB-DU is responsible for transmitting the system information according to the scheduling parameters available.

The gNB-DU is responsible for the encoding of NR master information block (MIB). In case broadcast of system information block type-1 (SIB1) and other SI messages is needed, the gNB-DU is responsible for the encoding of SIB1 and the gNB-CU is responsible for the encoding of other SI messages.

(3) F1 UE Context Management Function

The F1 UE context management function supports the establishment and modification of the necessary overall UE context.

The establishment of the F1 UE context is initiated by the gNB-CU and accepted or rejected by the gNB-DU based on admission control criteria (e.g., resource not available).

The modification of the F1 UE context can be initiated by either gNB-CU or gNB-DU. The receiving node can accept or reject the modification. The F1 UE context management function also supports the release of the context previously established in the gNB-DU. The release of the context is triggered by the gNB-CU either directly or following a request received from the gNB-DU. The gNB-CU request the gNB-DU to release the UE Context when the UE enters RRC_IDLE or RRC_INACTIVE.

This function can be also used to manage DRBs and SRBs, i.e., establishing, modifying and releasing DRB and SRB resources. The establishment and modification of DRB resources are triggered by the gNB-CU and accepted/rejected by the gNB-DU based on resource reservation information and QoS information to be provided to the gNB-DU.

For each DRB to be setup or modified, the S-NSSAI may be provided by gNB-CU to the gNB-DU in the UE context setup procedure and the UE context modification procedure.

The mapping between QoS flows and radio bearers is performed by gNB-CU and the granularity of bearer related management over F1 is radio bearer level. For NG-RAN, the gNB-CU provides an aggregated DRB QoS profile and QoS flow profile to the gNB-DU, and the gNB-DU either accepts the request or rejects it with appropriate cause value. To support packet duplication for intra-gNB-DU carrier aggregation (CA), one data radio bearer should be configured with two GPRS tunneling protocol (GTP)-U tunnels between gNB-CU and a gNB-DU.

With this function, gNB-CU requests the gNB-DU to setup or change of the special cell (SpCell) for the UE, and the gNB-DU either accepts or rejects the request with appropriate cause value.

With this function, the gNB-CU requests the setup of the secondary cell(s) (SCell(s)) at the gNB-DU side, and the gNB-DU accepts all, some or none of the SCell(s) and replies to the gNB-CU. The gNB-CU requests the removal of the SCell(s) for the UE.

(4) RRC Message Transfer Function

This function allows to transfer RRC messages between gNB-CU and gNB-DU. RRC messages are transferred over F1-C. The gNB-CU is responsible for the encoding of the dedicated RRC message with assistance information provided by gNB-DU.

(5) Paging Function

The gNB-DU is responsible for transmitting the paging information according to the scheduling parameters provided.

The gNB-CU provides paging information to enable the gNB-DU to calculate the exact paging occasion (PO) and paging frame (PF). The gNB-CU determines the paging assignment (PA). The gNB-DU consolidates all the paging records for a particular PO, PF and PA, and encodes the final RRC message and broadcasts the paging message on the respective PO, PF in the PA.

(6) Warning Messages Information Transfer Function

This function allows to cooperate with the warning message transmission procedures over NG interface. The gNB-CU is responsible for encoding the warning related SI message and sending it together with other warning related information for the gNB-DU to broadcast over the radio interface.

Figure 11:
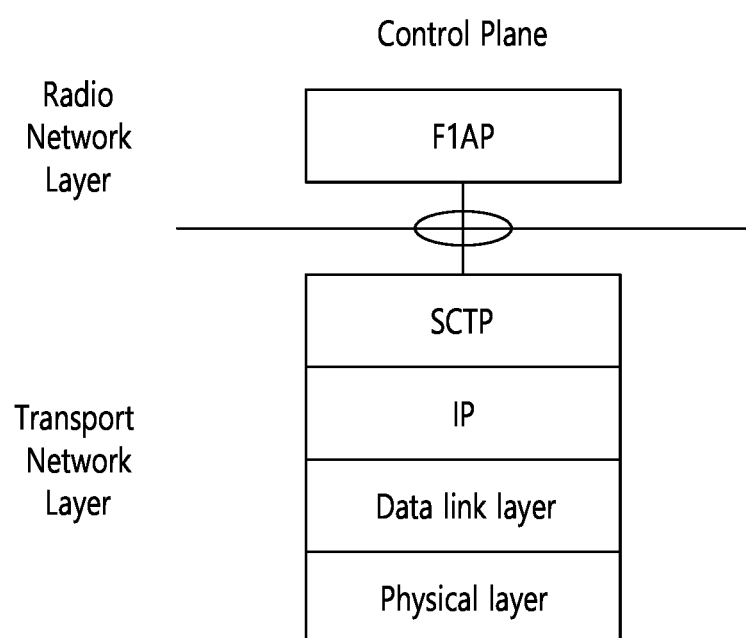
FIG. 11 shows an interface protocol structure for F1-C to which technical features of the present disclosure can be applied.

FIG. 11 shows an interface protocol structure for F1-C to which technical features of the present disclosure can be applied.

A transport network layer (TNL) is based on Internet protocol (IP) transport, comprising a stream control transmission protocol (SCTP) layer on top of the IP layer. An application layer signaling protocol is referred to as an F1 application protocol (E1AP).

According to some embodiments of the present disclosure, separation of Central Unit (CU) and Distributed Unit (DU) and separation of Control Plane (CP) and User Plane (UP) may be supported.

For example, a gNB Central Unit (gNB-CU) is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU.

For example, a gNB Distributed Unit (gNB-DU) is a logical node hosting RLC, MAC and PHY layers of the gNB or en-gNB, and its operation is partly controlled by gNB-CU. One gNB-DU supports one or multiple cells. One cell is supported by only one gNB-DU. The gNB-DU terminates the F1 interface connected with the gNB-CU.

For example, gNB-CU-Control Plane (gNB-CU-CP) is a logical node hosting the RRC and the control plane part of the PDCP protocol of the gNB-CU for an en-gNB or a gNB. The gNB-CU-CP terminates the E1 interface connected with the gNB-CU-UP and the F1-C interface connected with the gNB-DU.

For example, a gNB-CU-User Plane (gNB-CU-UP) is a logical node hosting the user plane part of the PDCP protocol of the gNB-CU for an en-gNB, and the user plane part of the PDCP protocol and the SDAP protocol of the gNB-CU for a gNB. The gNB-CU-UP terminates the E1 interface connected with the gNB-CU-CP and the F1-U interface connected with the gNB-DU.

Multi radio access technology (RAT) dual connectivity is described. Section 4 of 3GPP TS 37.340 V15.3.0 (2018-09) can be referred.

Multi-RAT dual connectivity (MR-DC) is a generalization of the intra-E-UTRA dual connectivity (DC), where a multiple reception (Rx)/transmission (Tx) UE may be configured to utilize resources provided by two different nodes connected via non-ideal backhaul, one providing E-UTRA access and the other one providing NR access. One node acts as the master node (MN) and the other as the secondary node (SN). The MN and SN are connected via a network interface and at least the MN is connected to the core network.

MR-DC is designed based on the assumption of non-ideal backhaul between the different nodes but can also be used in case of ideal backhaul.

E-UTRAN supports MR-DC via E-UTRA-NR dual connectivity (EN-DC), in which a UE is connected to one eNB that acts as a MN and one en-gNB that acts as a SN. The eNB is connected to the EPC via the S1 interface and to the en-gNB via the X2 interface. The en-gNB might also be connected to the EPC via the S1-U interface and other en-gNBs via the X2-U interface. EN-DC may be referred to as "Option 3" of MR-DC.

NG-RAN supports NG-RAN E-UTRA-NR dual connectivity (NGEN-DC), in which a UE is connected to one ng-eNB that acts as a MN and one gNB that acts as a SN. The ng-eNB is connected to the 5GC and the gNB is connected to the ng-eNB via the Xn interface. NGEN-DC may be referred to as "Option 7" of MR-DC.

NG-RAN supports NR-E-UTRA dual connectivity (NE-DC), in which a UE is connected to one gNB that acts as a MN and one ng-eNB that acts as a SN. The gNB is connected to 5GC and the ng-eNB is connected to the gNB via the Xn interface. NE-DC may be referred to as "Option 4" of MR-DC.

For control plane radio protocol architecture, in MR-DC, the UE has a single RRC state, based on the MN RRC and a single C-plane connection towards the core network. Each radio node has its own RRC entity (E-UTRA version if the node is an eNB or NR version if the node is a gNB) which can generate RRC PDUs to be sent to the UE.

RRC PDUs generated by the SN can be transported via the MN to the UE. The MN always sends the initial SN RRC configuration via master cell group (MCG) SRB (SRB1), but subsequent reconfigurations may be transported via MN or SN. When transporting RRC PDU from the SN, the MN does not modify the UE configuration provided by the SN.

In EN-DC, at initial connection establishment, SRB1 uses E-UTRA PDCP. After initial connection establishment, MCG SRBs (SRB1 and SRB2) can be configured by the network to use either E-UTRA PDCP or NR PDCP. A PDCP version change (release of old PDCP and establish of new PDCP) of SRBs can be supported in either direction (i.e., from E-UTRA PDCP to NR PDCP or vice versa) via a handover procedure (reconfiguration with mobility) or, for the initial change from E-UTRA PDCP to NR PDCP, with a reconfiguration without mobility, when the network knows there is no UL data in buffer and before the initial security activation. For EN-DC capable UEs, NR PDCP can be configured for DRBs and SRBs also before EN-DC is configured.

If the SN is a gNB (i.e., for EN-DC and NGEN-DC), the UE can be configured to establish a SRB with the SN (SRB3) to enable RRC PDUs for the SN to be sent directly between the UE and the SN. RRC PDUs for the SN can only be transported directly to the UE for SN RRC reconfiguration not requiring any coordination with the MN. Measurement reporting for mobility within the SN can be done directly from the UE to the SN if SRB3 is configured.

Split SRB is supported for all MR-DC options, allowing duplication of RRC PDUs generated by the MN, via the direct path and via the SN. Split SRB uses NR PDCP.

In EN-DC, the secondary cell group (SCG) configuration is kept in the UE during suspension. The UE releases the SCG configuration (but not the radio bearer configuration) during resumption initiation.

For user plane radio protocol architecture, in MR-DC, from a UE perspective, three bearer types exist: MCG bearer, SCG bearer and split bearer.

For EN-DC, the network can configure either E-UTRA PDCP or NR PDCP for MN terminated MCG bearers while NR PDCP is always used for all other bearers.

In MR-DC with 5GC, NR PDCP is always used for all bearer types. In NGEN-DC, E-UTRA RLC/MAC is used in the MN while NR RLC/MAC is used in the SN. In NE-DC, NR RLC/MAC is used in the MN while E-UTRA RLC/MAC is used in the SN.

From a network perspective, each bearer (MCG, SCG and split bearer) can be terminated either in MN or in SN.

Even if only SCG bearers are configured for a UE, for SRB1 and SRB2 the logical channels are always configured at least in the MCG, i.e., this is still an MR-DC configuration and a primary cell (PCell) always exists.

If only MCG bearers are configured for a UE, i.e., there is no SCG, this is still considered an MR-DC configuration, as long as at least one of the bearers is terminated in the SN.

For control plane network interfaces, in MR-DC, there is an interface between the MN and the SN for control plane signaling and coordination. For each MR-DC UE, there is also one control plane connection between the MN and a corresponding CN entity. The MN and the SN involved in MR-DC for a certain UE control their radio resources and are primarily responsible for allocating radio resources of their cells.

In MR-DC with EPC (EN-DC), the involved core network entity is the MME. S1-MME is terminated in MN and the MN and the SN are interconnected via X2-C.

In MR-DC with 5GC (NGEN-DC, NE-DC), the involved core network entity is the AMF. NG-C is terminated in the MN and the MN and the SN are interconnected via Xn-C.

For user plane network interfaces, there are different U-plane connectivity options of the MN and SN involved in MR-DC for a certain UE. The U-plane connectivity depends on the bearer option configured:
(1) For MN terminated bearers, the user plane connection to the CN entity is terminated in the MN;
(2) For SN terminated bearers, the user plane connection to the CN entity is terminated in the SN;

(3) The transport of user plane data over the Uu either involves MCG or SCG radio resources or both:
  For MCG bearers, only MCG radio resources are involved;
  For SCG bearers, only SCG radio resources are involved;
  For split bearers, both MCG and SCG radio resources are involved.
(4) For split bearers, MN terminated SCG bearers and SN terminated MCG bearers, PDCP data is transferred between the MN and the SN via the MN-SN user plane interface.

For MR-DC with EPC (EN-DC), X2-U interface is the user plane interface between MN and SN, and S1-U is the user plane interface between the MN, the SN or both and the S-GW.

For MR-DC with 5GC (NGEN-DC, NE-DC), Xn-U interface is the user plane interface between MN and SN, and NG-U is the user plane interface between the MN, the SN or both and the UPF.

MR-DC with 5GC is described. Section 10.12.2 of 3GPP TS 37.340 v16.0.0 (2019-12) can be referred.

MR-DC with 5GC with RRC_INACTIVE-SCG configuration released in SN is described.

The Activity Notification function may be used to enable MR-DC with 5GC with RRC_INACTIVE operation. The MN node may decide, after inactivity is reported from the SN and also MN resources show no activity, to send the UE to RRC_INACTIVE. Resumption to RRC_CONNECTED may take place after activity is reported from the SN for SN terminated bearers.

Figure 12:
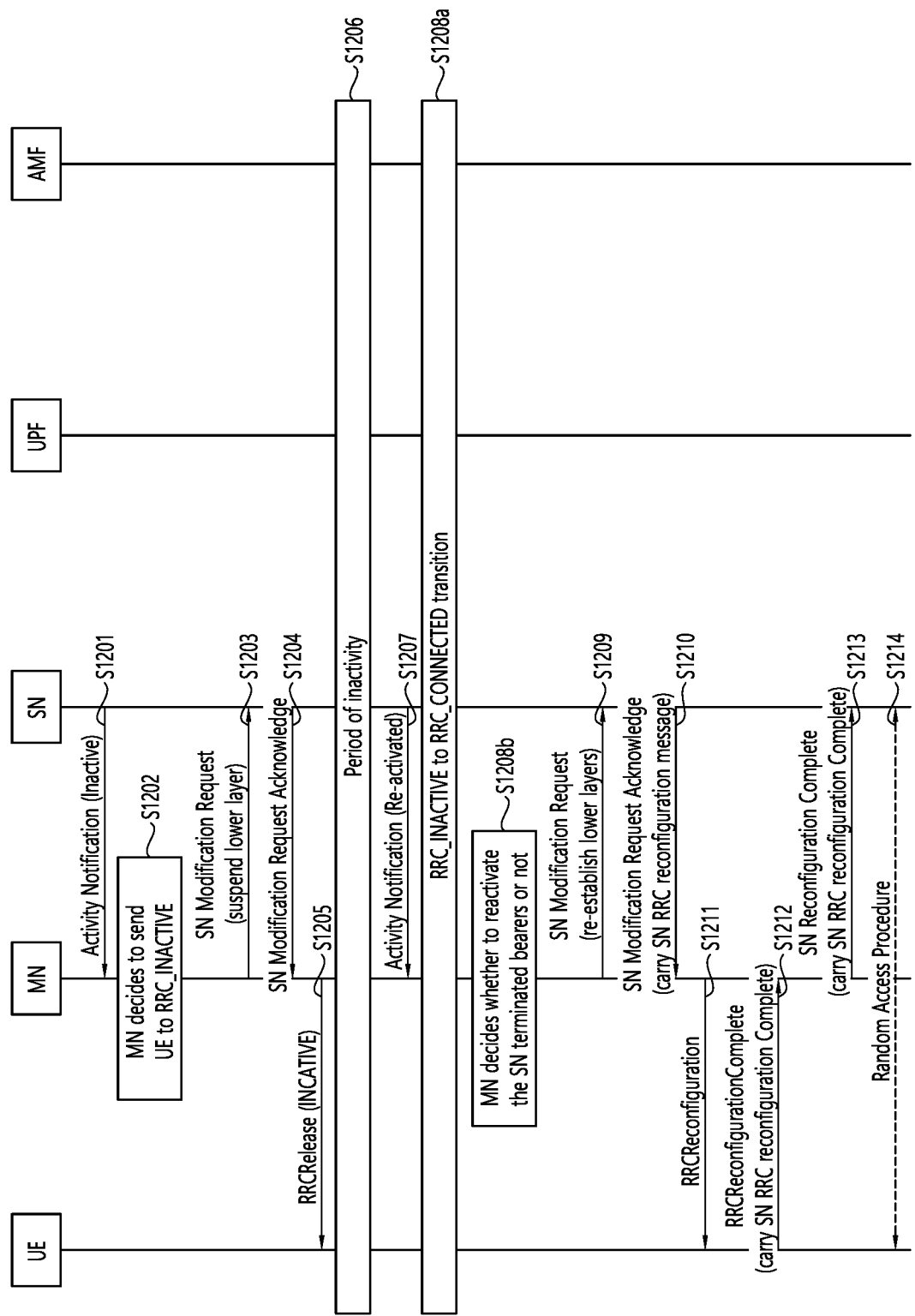
FIG. 12 shows support of Activity Notification in MR-DC with 5GC with RRC_INACTIVE-SCG configuration released in SN to which implementations of the present disclosure is applied.

FIG. 12 shows support of Activity Notification in MR-DC with 5GC with RRC_INACTIVE-SCG configuration released in SN to which implementations of the present disclosure is applied.

FIG. 12 shows how Activity Notification function interacts with NG-RAN functions for RRC_INACTIVE and SN Modification procedures in order to keep the higher layer MR-DC NG-RAN resources established for UEs in RRC_INACTIVE, including NG and Xn interface C-plane, U-plane and bearer contexts established while lower layer MCG and SCG resources are released. NG-RAN memories the cell group configuration for MCG in order to apply delta signalling at resume. After the UE has transited successfully back to RRC_CONNECTED, lower layer SCG resources are established afterwards by means of RRC Connection Reconfiguration.

In step S1201, the SN notifies the MN about user data inactivity for SN terminated bearers.

In step S1202, the MN decides to send the UE to RRC_INACTIVE.

In steps S1203 and S1204, the MN triggers the MN initiated SN Modification procedure, requesting the SN to release lower layers.

In step S1205, the UE is sent to RRC_INACTIVE.

In steps S1206 to S1208a, after a period of inactivity, upon activity notification from the SN, the UE returns to RRC_CONNECTED.

In step S1208b, MN decides whether to reactivate the SN terminated bearers. If (e.g. due to UE mobility), MN decides not to reactivate the SN terminated bearers, it initiates the MN initiated SN release procedure and the procedure ends.

In steps S1209 to S1210, the MN triggers the MN initiated SN Modification procedure to re-establish lower layers. The SN provides configuration data within an SN RRC configuration message.

In steps S1211 to S1214, the RRCConnectionReconfiguration procedure commences.

MR-DC with 5GC with RRC_INACTIVE-SCG configuration suspended in SN is described.

The Activity Notification function may be used to enable MR-DC with 5GC with RRC_INACTIVE operation. The MN node may decide, after inactivity is reported from the SN and also MN resources show no activity, to send the UE to RRC_INACTIVE, while keeping the SCG configuration. Resumption to RRC_CONNECTED may take place after activity is reported from the SN for SN terminated bearers.

Figure 13:
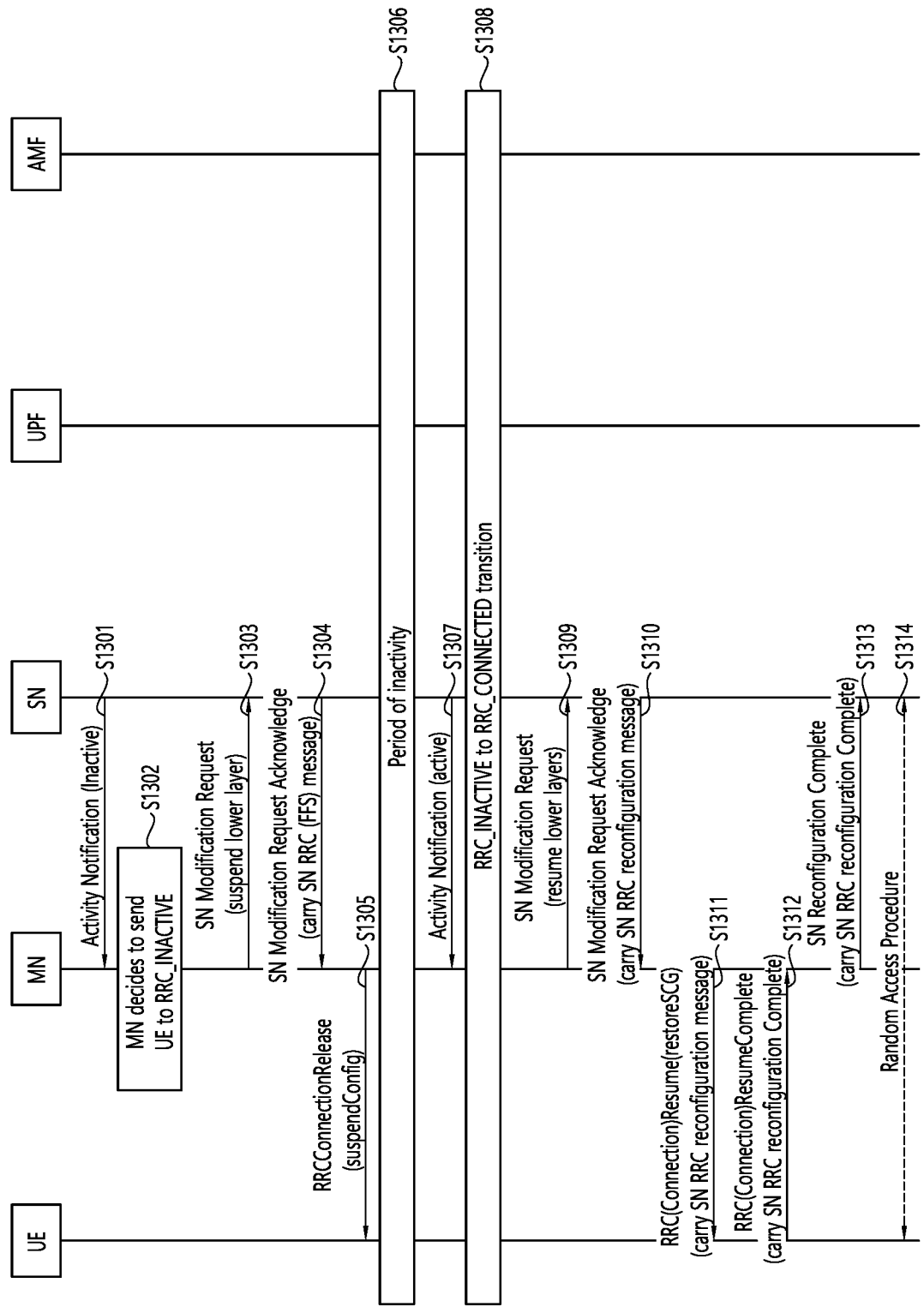
FIG. 13 shows support of Activity Notification in MR-DC with 5GC with RRC_INACTIVE-SCG configuration suspended in SN to which implementations of the present disclosure is applied.

FIG. 13 shows support of Activity Notification in MR-DC with 5GC with RRC_INACTIVE-SCG configuration suspended in SN to which implementations of the present disclosure is applied.

In particular, FIG. 13 illustrates how Activity Notification function interacts with NG-RAN functions for RRC_INACTIVE and SN Modification procedures in order to keep the full MR-DC NG-RAN resources established for UEs in RRC_INACTIVE. When the UE transits successfully back to RRC_CONNECTED, lower layer MCG and SCG configurations are restored or reconfigured by means of RRC (Connection) Resume.

In step S1301, the SN notifies the MN about user data inactivity for SN terminated bearers.

In step S1302, the MN decides to send the UE to RRC_INACTIVE.

In steps S1303 and S1304, the MN triggers the MN initiated SN Modification procedure, requesting the SN to suspend lower layers.

In step S1305, the UE is sent to RRC_INACTIVE.

In steps S1306 to S1308, after a period of inactivity, upon activity notification from the SN, the MN decides to return the UE to RRC_CONNECTED.

In step S1308bis, the MN decides whether to reactivate the SN terminated bearers. If (e.g. due to UE mobility), the MN decides not to reactivate the SN terminated bearers, it initiates the MN initiated SN release procedure, rather than the MN initiated SN modification procedure in steps S1309 and S1310.

In steps S1309 and S1310, the MN triggers the MN initiated SN Modification procedure to resume the SCG lower layers. If the SCG configuration needs to be updated, the SN provides the configuration data within an SN RRC configuration message.

In steps S1311 and S1312, the RRC (Connection) Resume procedure commences, where the UE is instructed to resume both the MCG and the SCG. If the SCG configuration is to be updated, the new configuration is provided in the RRC (Connection)Resume message.

In step S1313, the MN informs the SN that the UE has completed the reconfiguration procedure successfully, via the SN Reconfiguration Complete message, including the SN RRC response message, if received from the UE.

In step S1314, if instructed, the UE performs synchronisation towards the PSCell of the SN.

Meanwhile, in NR, small data transmission in RRC-INACTIVE state could be supported. For example, context fetch and data forwarding (with and without anchor relocation) in inactive state could be supported.

However, the mechanisms to deliver the UP data between the MN and SN in MR-DC without a state transition to RRC-CONNECTED state.

Therefore, studies for small data transmission in RRC inactive state in MR-DC in a wireless communication system are needed.

Hereinafter, a method for small data transmission in RRC inactive state in MR-DC in a wireless communication system, according to some embodiments of the present disclosure, will be described.

Figure 14:
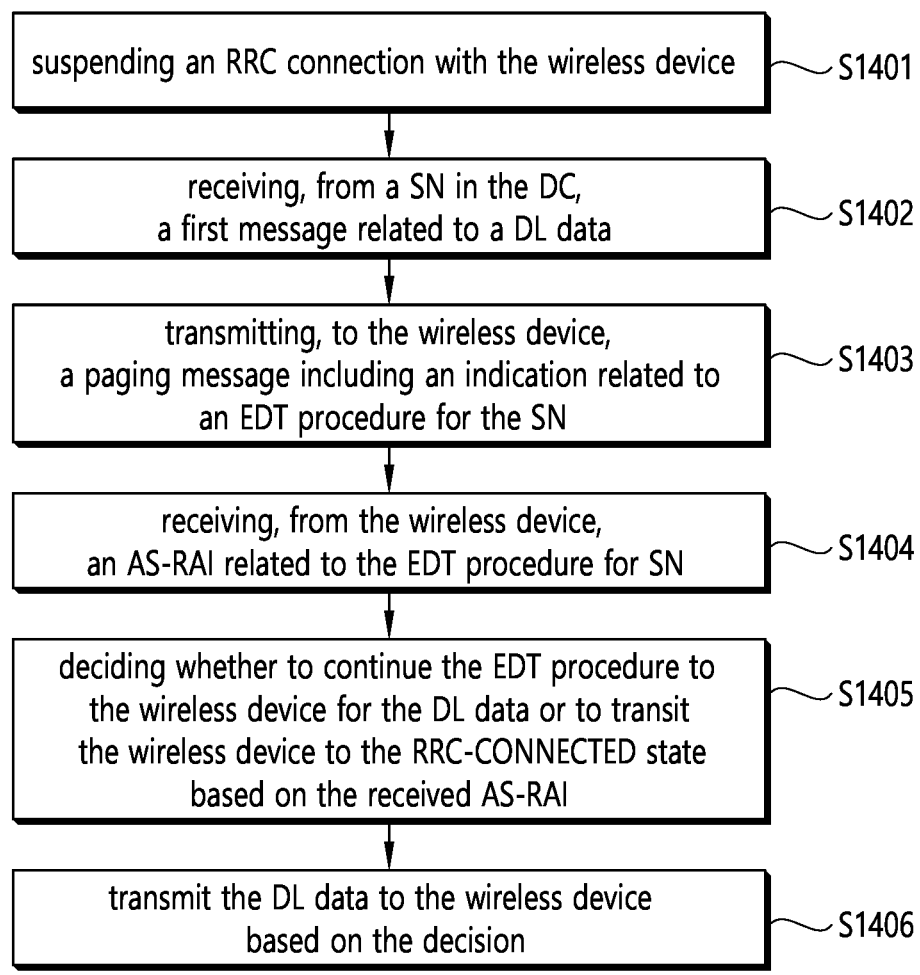
FIG. 14 shows an example of a method for small data transmission in RRC inactive state in MR-DC in a wireless communication system.

FIG. 14 shows an example of a method for small data transmission in RRC inactive state in MR-DC in a wireless communication system.

In particular, FIG. 14 shows an example of a method performed by a Master Node (MN) in a Dual Connectivity (DC) for a wireless device in a wireless communication system.

For example, the MN may be connected with a Secondary Node (SN) in the DC and a core network node (for example, 5GC). For example, the SN may be connected with the core network node. For example, the core network node may include an Access and Mobility management Function (AMF) and a User Plane Function (UPF).

In step S1401, the MN may suspend a Radio Resource Control (RRC) connection with the wireless device.

For example, a MN may send, to the wireless device, an RRC RELEASE message with Suspend configuration. The RRC RELEASE message with Suspend configuration may indicate to transit to the RRC-INACTIVE state.

For example, the wireless device may enter to the RRC-INACTIVE state. The wireless device and MN may store the UE context for the wireless device, respectively. The NG-C connection between MN and AMF may be maintained. In addition, the NG-U connection between MN and UPF may be maintained. The NG-C connection between SN and AMF may be maintained. In addition, the NG-U connection between SN and UPF may be maintained.

In step S1402, the MN may receive, from a Secondary Node (SN) in the DC, a first message related to a downlink (DL) data.

According to some embodiments of the present disclosure, the first message may include a size of the DL data. For example, the first message may include a request for the EDT procedure for the DL data. For example, the first message may be an activity notification.

For example, a MN may transmit, to the SN, a transport block size (TBS) before receiving the first message. For example, the size of the DL data may be included in the first message, when the size of the DL data is less than or equal to the TBS.

According to some embodiments of the present disclosure, when a DL data arrives in the SN from 5GC, the SN may initiate the Activity Notification procedure to notify the MN about user data activity for SN terminated bearers. For example, the SN may transmit, to the MN, an activity notification.

For the case where the DL data size is less than or equal to a TBS, the SN may include the DL data size in the activity notification to request to the MN the EDT for the DL data.

According to some embodiments of the present disclosure, the first message includes the DL data. For example, when a DL data arrives in the SN from 5GC, the SN may transmit, to the MN, the DL data.

For example, a MN may transmit, to the SN, a transport block size (TBS) before receiving the first message. For example, the DL data may be transmitted, based on that a size of the DL data is less than or equal to the TBS.

In other words, when a data arrives in the SN from 5GC, the SN may check whether the DL data size is less than or equal to a TBS or not. If yes, the SN may forward the DL data to the MN instead of initiating the Activity Notification procedure to notify the MN about user data activity for SN terminated bearers.

In step S1403, the MN may transmit, to the wireless device, a paging message including an indication related to an Early Data Transmission (EDT) procedure for the SN.

For example, when a wireless device is being paged with the EDT indication for SN or when new data arrives in the uplink buffer, the wireless device may initiate the RACH procedure for EDT.

In step S1404, the MN may receive, from the wireless device, an Access Stratum-Release Assistance Information (AS-RAI) related to the EDT procedure for SN.

For example, the AS-RAI may inform whether there is Uplink (UL) data transmission and/or Downlink (DL) data transmission for the wireless device subsequent to the early data procedure, or not.

For example, the AS-RAI may inform that (1) no further (Uplink) UL data transmission and/or DL data transmission for the wireless device from the SN is expected, or (2) only a single DL data transmission for the wireless device from the SN is expected.

For example, the AS-RAI may be included in a Medium Access Control (MAC)-Control Element (CE). In other words, the wireless device may transmit, to the MN, a MAC-CE including the AS-RAI.

For example, the AS-RAI may be included in an RRC resume request message. In other words, the wireless device may transmit, to the MN, the RRC resume request message including the AS-RAI.

In step S1405, the MN may decide whether to continue the EDT procedure to the wireless device for the DL data or to transit the wireless device to the RRC-CONNECTED state based on the received AS-RAI.

According to some embodiments of the present disclosure, a MN may check whether a UE context for the wireless device is stored or not, upon receiving the AS-RAI from the wireless device in step S1404.

The MN may perform the decision, whether to continue the EDT procedure to the wireless device for the DL data or to transit the wireless device to the RRC-CONNECTED state, based on that the UE context for the wireless device is stored in the MN.

According to some embodiments of the present disclosure, the MN may decide whether to continue the EDT procedure to the wireless device for the DL data or to transit the wireless device to the RRC-CONNECTED state based on the received AS-RAI, a size of the DL data, and/or a traffic pattern included in the subscription information.

For example, the MN may receive, from a core network node, a subscription information including a traffic pattern. The MN may use the traffic pattern included in the subscription information to the decision, whether to continue the EDT procedure to the wireless device for the DL data or to transit the wireless device to the RRC-CONNECTED state.

For example, the MN may receive, from the SN, the first message including a size of the DL data in step S1402. The MN may use the size of the DL data to decide, whether to continue the EDT procedure to the wireless device for the DL data or to transit the wireless device to the RRC-CONNECTED state.

For example, the MN may receive, from the SN, the first message including the DL data in step S1402. The MN may use information on the DL data (for example, the size of the DL data) to decide whether to continue the EDT procedure to the wireless device for the DL data or to transit the wireless device to the RRC-CONNECTED state.

According to some embodiments of the present disclosure, the MN may decide whether to continue the EDT procedure to the wireless device for the DL data or to transit the wireless device to the RRC-CONNECTED state, based on expected size of data transmission.

For example, when the expected size of data transmission towards the SN, based on the AS-RAI and/or the traffic pattern, is less than or equal to a predetermined threshold value, a MN may decide to continue the EDT procedure to the wireless device.

For example, when the AS-RAI informs that only small data transmission for the SN is expected, the MN may decide to continue the EDT procedure to the wireless device.

For example, when the AS-RAI informs that no further Uplink (UL) data transmission and/or Downlink (DL) data transmission for the wireless device from the SN is expected, the MN may decide to continue the EDT procedure to the wireless device.

For example, when (1) the AS-RAI informs that no further UL data transmission and/or DL data transmission for the wireless device from the SN is expected, or (2) the AS-RAI informs only a single DL data transmission for the wireless device from the SN is expected, the MN may decide to continue the EDT procedure to the wireless device.

For example, when (1) the AS-RAI informs that only small data transmission for the wireless device from the SN is expected, and (2) the traffic pattern in the subscriber information informs that only small data transmission for the wireless device from the SN is expected, the MN may decide to continue the EDT procedure to the wireless device.

For example, when (1) the AS-RAI informs that no further UL data transmission and/or DL data transmission for the wireless device from the SN is expected, (2) the AS-RAI informs only a single DL data transmission for the wireless device from the SN is expected, (3) the traffic pattern informs that no UL data transmission and/or DL data transmission for the wireless device from the SN is expected, and/or (4) the traffic pattern informs that only a small data transmission for the wireless device from the SN is expected, the MN may decide to continue the EDT procedure to the wireless device.

For other example, when the expected size of data transmission based on the AS-RAI and the traffic pattern is greater than a predetermined threshold value, the MN may decide to transit the wireless device to the RRC-CONNECTED state.

In step S1406, the MN may transmit the DL data to the wireless device based on the decision.

According to some embodiments of the present disclosure, the MN may receive, from the SN, the first message including a size of the DL data in step S1402. In this case, the MN may transmit, to the SN, a second message to request the DL data upon deciding to continue the EDT procedure to the wireless device for the DL data. The MN may receive, from the SN, the DL data.

Upon receiving the DL data from the SN, the MN may transmit, to the wireless device, an RRC release message and the DL data. For example, the DL data may be ciphered on Dedicated Traffic Channel (DTCH) multiplexed with the RRC Release message on Dedicated Control Channel (DCCH).

According to some embodiments of the present disclosure, the MN may receive, from the SN, the first message including the DL data in step S1402. In this case, the MN may transmit, to the wireless device, an RRC release message and the DL data, upon deciding to continue the EDT procedure to the wireless device for the DL data. For example, the DL data may be ciphered on Dedicated Traffic Channel (DTCH) multiplexed with the RRC Release message on Dedicated Control Channel (DCCH).

According to some embodiments of the present disclosure, for the RRC_INACTIVE state, UL small data transmissions for RACH-based schemes (for example, 2-step and 4-step RACH) could be supported.

For example, general procedure to enable UP data transmission for small data packets from INACTIVE state (for example, using MSGA or MSG3) could be supported.

For example, a network could support to enable flexible payload sizes larger than the CCCH message size that is possible currently for INACTIVE state for MSGA and MSG3 to support UP data transmission in UL (for example, actual payload size can be up to network configuration).

For example, a network could support context fetch and data forwarding (with and without anchor relocation) in INACTIVE state for RACH-based solutions.

Hereinafter, a method for UP small data transmission in RRC-INACTIVE state considering MR-DC, according to some embodiments of the present disclosure, will be described.

Figure 15A:
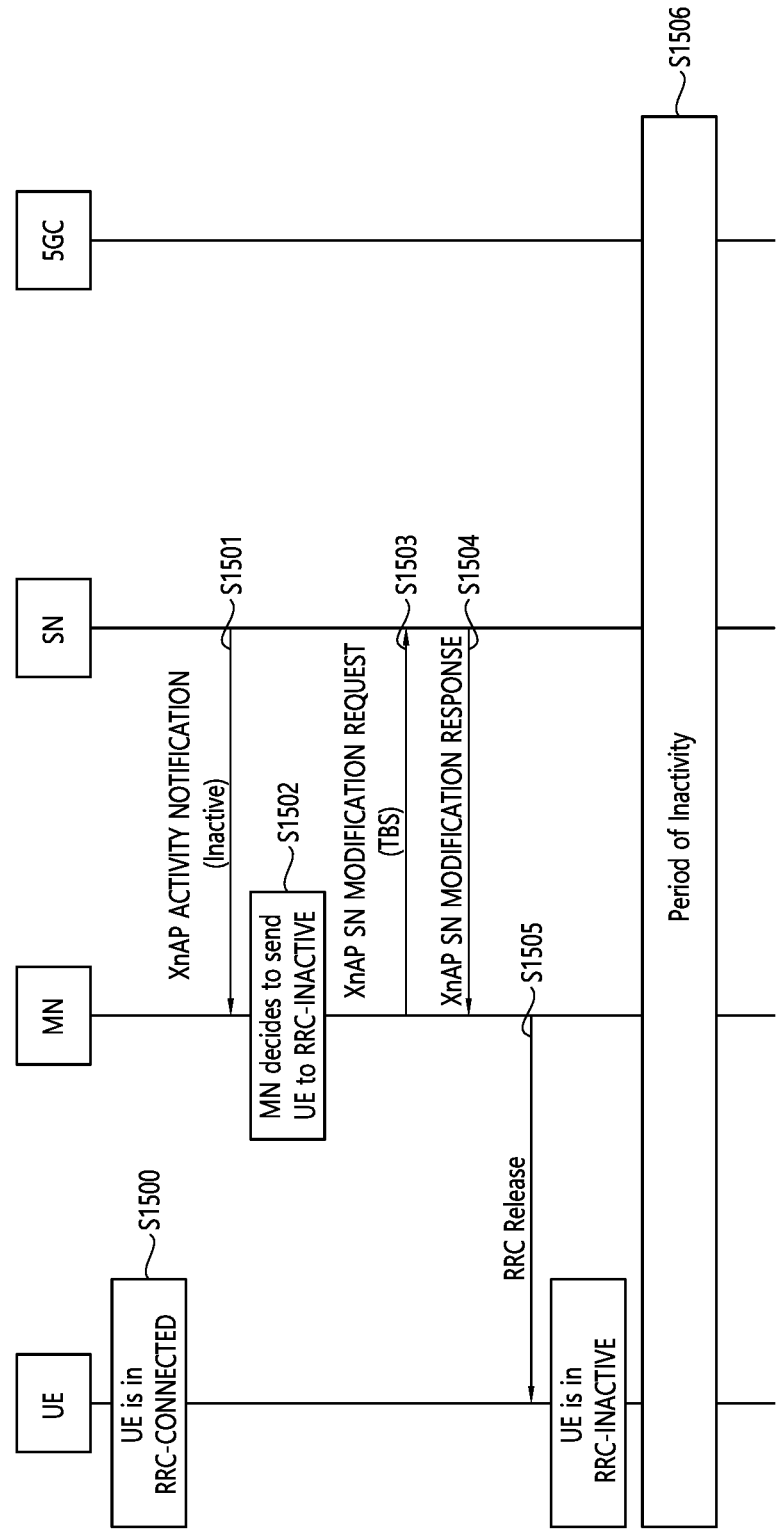
FIGS. 15A and 15B show an example of a procedure for UP small data transmission in RRC-INACTIVE state considering MR-DC.
Figure 15B:
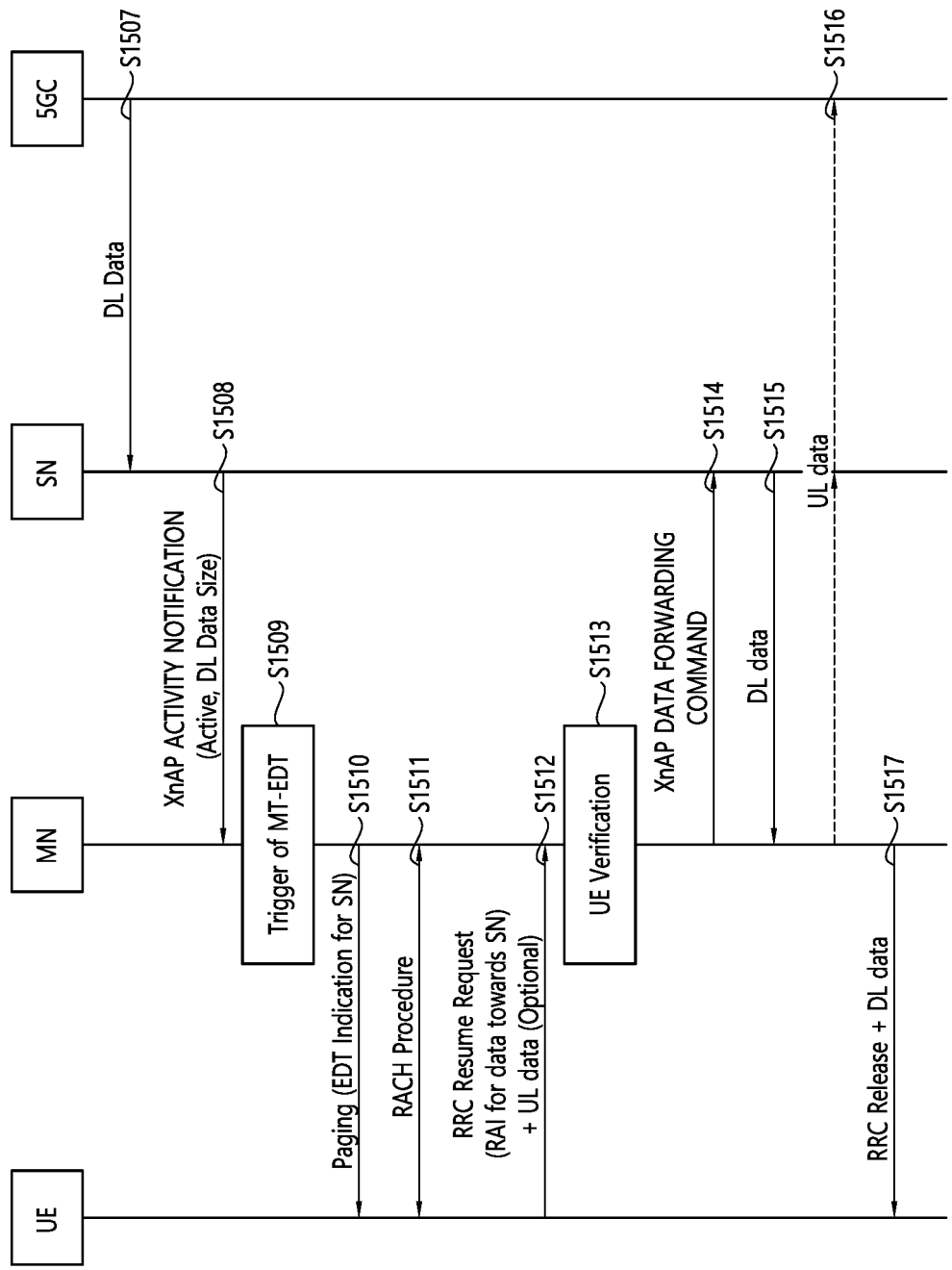

FIGS. 15A and 15B show an example of a procedure for UP small data transmission in RRC-INACTIVE state considering MR-DC.

According to some embodiments of the present disclosure, the SN may inform the MN of the DL data size, in order to deliver the UP data between MN and SN for the UE in RRC-INACTIVE state.

For example, based on this information, the MN may decide to initiate the EDT procedure for the UE. In addition, the UE may also indicate to the MN the information on whether there is subsequent Uplink (UL) data transmission and/or Downlink (DL) data transmission for the UE towards the SN or not. The MN may request to the SN the forwarding for the DL data.

Referring to FIGS. 15A and 15B, in step S1500, the UE may be in RRC-CONNECTED state.

In step S1501, the SN may notify the MN about user data inactivity for SN terminated bearers.

In step S1502, the MN may decide to send the UE to RRC_INACTIVE.

In steps S1503 and S1504, the MN may trigger the MN initiated SN Modification procedure, requesting the SN to release or suspend the lower layers. The transport block size (TBS) may be also included into the XnAP SN MODIFICATION REQUEST message.

In step S1505, the MN may send the RRC RELEASE message with Suspend configuration to indicate to transit to the RRC-INACTIVE state.

The UE may be now in RRC-INACTIVE state. The UE and MN may store the UE context, respectively. The NG-C connection between MN and AMF may be maintained. In addition, the NG-U connection between MN and UPF may be maintained. The NG-C connection between SN and AMF may be maintained. In addition, the NG-U connection between SN and UPF may be maintained.

In step S1506, after a period of inactivity, the UE may be still in RRC-INACTIVE state.

In step S1507, the new data may arrive in the SN from 5GC.

In step S1508, the SN may initiate the Activity Notification procedure to notify the MN about user data activity for SN terminated bearers. For the case where the downlink data size is less than or equal to a TBS, the SN may include the DL data size to request to the MN the EDT for the DL data.

In step S1509, based on the expected UE behaviour, traffic pattern, the downlink data size received in step S1508, the MN may decide to initiate the EDT procedure for the DL data.

In step S1510, the MN may send the Paging message containing the EDT indication for SN.

In step S1511, when the UE is being paged with the EDT indication for SN or when new data arrives in the uplink buffer, the UE may initiate the RACH procedure for EDT.

In step S1512, the UE may resume the connection by sending an RRC Resume Request message or new message to MN. The UE may include Inactive-RNTI Radio Network Temporary Identifier (I-RNTI) of the UE, the RRC resume cause, and authentication token (for example, Resume MAC-I).

When the UE is being paged with the EDT indication for SN, the UE may also include AS-Release Assistance information (for example, by using BSR, MAC CE) for data towards the SN in a message to the MN.

For example, the AS-RAI may indicate (1) no further Uplink and Downlink Data transmission towards SN, or (2) only a single Downlink Data transmission subsequent to the Uplink transmission towards SN.

If the UE has the pending UL data, the UL data may be also transmitted on DTCH multiplexed with this message on CCCH.

In step S1513, on receiving the message from the UE, the MN may first check whether it is able to find the UE context or not. Based on the RAI from the UE, the data size, and/or the traffic pattern in subscription information from 5GC, the MN may decide whether to continue the EDT procedure for the frequent small data transmission (for example, single PDCP PDUs in uplink and/or single PDCP PDUs in downlink) or to transit to the RRC-CONNECTED state.

In step S1514, if the MN decides to continue the EDT procedure for the UE, the MN may send the XnAP DATA FORWARDING COMMAND message to request to the SN the DL data transmission for the UE.

In step S1515, upon reception of the message in step S1514, the SN may forward the DL data to the MN.

According to some embodiments of the present disclosure, steps S1507-S1510 and S1514-S1515 are needed only in case of DL data.

In step S1516, if there is the UL data received from the UE in step S1512, the MN may send the UL data to 5GC via the SN.

In step S1517, the MN may send the RRC Release message to the UE. The DL data may be sent ciphered on DTCH multiplexed with the RRC Release message or new message on DCCH.

According to the procedure in FIGS. 15A and 15B, the MN needs not to re-establish or resume the lower layers at SN to forward the small data, thus resulting in no UE's state transition to RRC-CONNECTED. In addition, the small data can be quickly forwarded to the UE for DL or 5GC for UL.

Figure 16A:
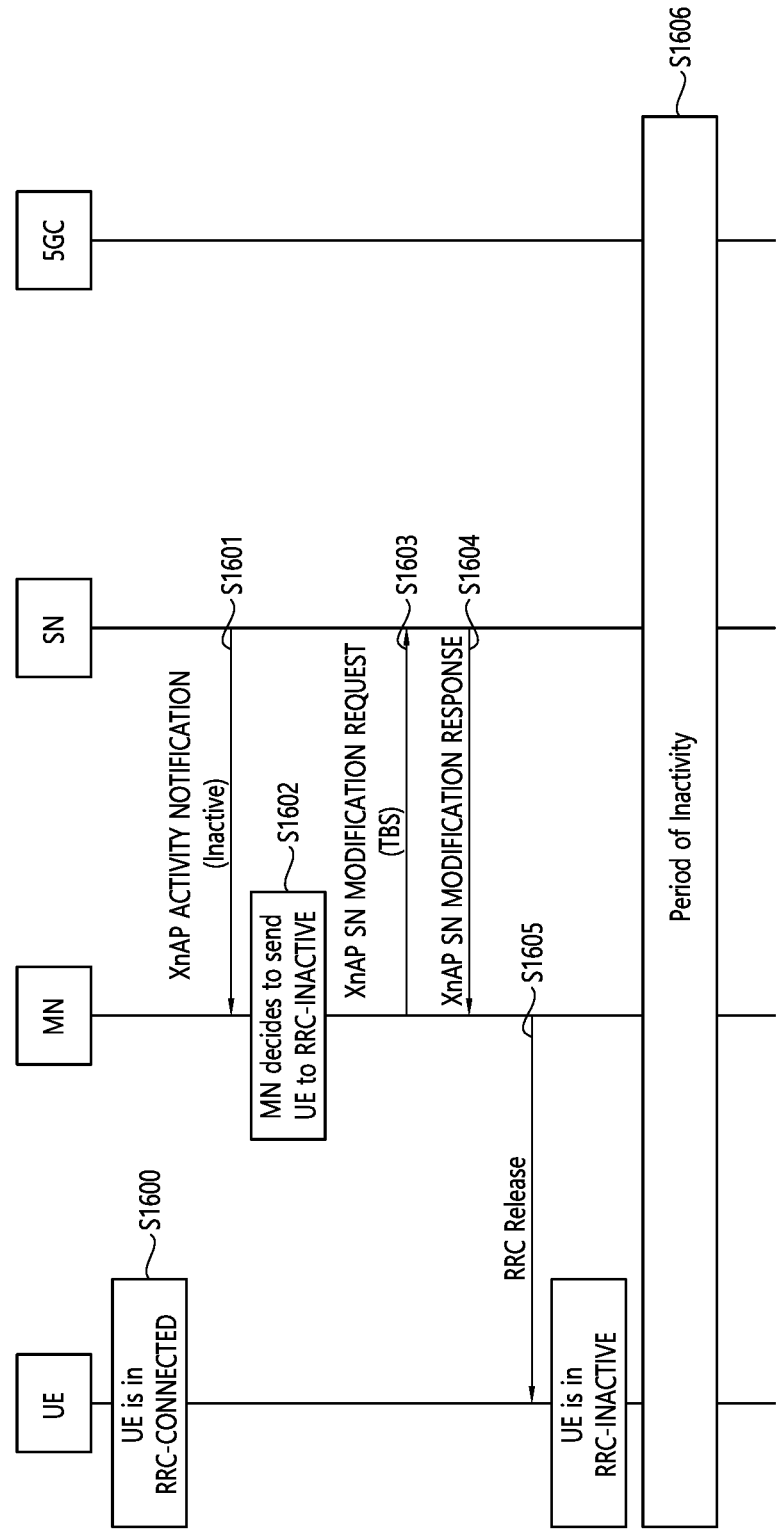
FIGS. 16A and 16B show another example of a procedure for UP small data transmission in RRC-INACTIVE state considering MR-DC.
Figure 16B:
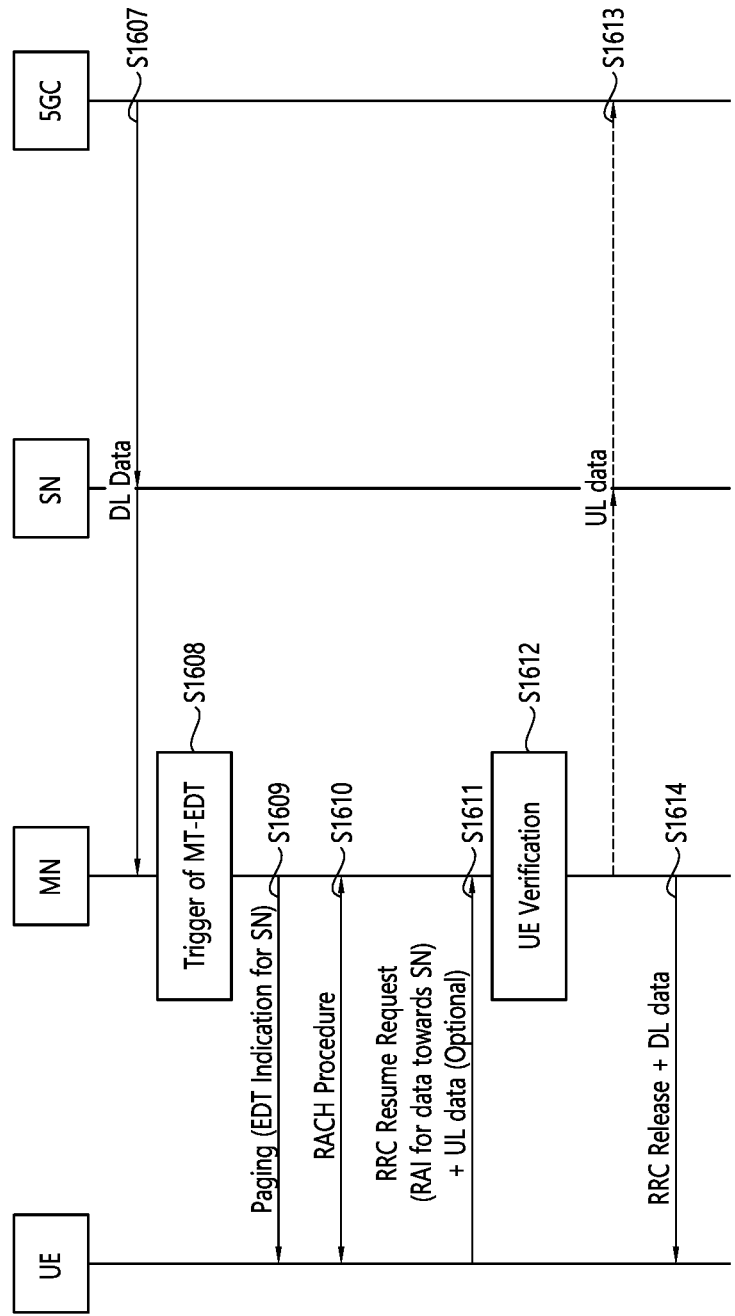

FIGS. 16A and 16B show another example of a procedure for UP small data transmission in RRC-INACTIVE state considering MR-DC.

According to some embodiments of the present disclosure, the MN may send the transport block size (TBS) to the SN, in order to deliver the UP data between MN and SN for the UE in RRC-INACTIVE state.

Based on TBS, the SN may check whether the downlink data size is less than or equal to a TBS, and forward the DL data to the MN instead of initiating the Activity Notification procedure to notify the MN about user data activity for SN terminated bearers. The MN may decide to initiate the EDT procedure for the UE. In addition, the UE may also indicate to the MN the information on whether there is subsequent UL data transmission and/or DL data transmission for the UE towards the SN or not.

Referring to FIGS. 16A and 16B, in step S1600, the UE may be in RRC-CONNECTED state.

In step S1601, the SN may notify the MN about user data inactivity for SN terminated bearers.

In step S1602, the MN may decide to send the UE to RRC_INACTIVE.

In step S1603 and S1604, the MN may trigger the MN initiated SN Modification procedure by requesting the SN to release or suspend the lower layers. For example, the MN may transmit, to the SN, an XnAP MODIFICATION REQUEST message. The MN may receive, from the SN, an XnAP MODIFICATION RESPONSE message. The transport block size (TBS) may be also included into the XnAP SN MODIFICATION REQUEST message.

In step S1605, the MN may send the RRC RELEASE message with Suspend configuration to indicate to transit to the RRC-INACTIVE state.

The UE may be now in RRC-INACTIVE state. The UE and MN may store the UE context, respectively. The NG-C connection between MN and AMF may be maintained. In addition, the NG-U connection between MN and UPF may be maintained. The NG-C connection between SN and AMF may be maintained. In addition, the NG-U connection between SN and UPF may be maintained.

In step S1606, after a period of inactivity, the UE may be still in RRC-INACTIVE state.

In step S1607, the new data arrive in the SN from 5GC. When a TBS is received in step S1603, the SN may first check whether the downlink data size is less than or equal to a TBS or not. If yes, the SN may just forward the DL data to the MN instead of initiating the Activity Notification procedure to notify the MN about user data activity for SN terminated bearers.

In step S1608, based on the expected UE behaviour, traffic pattern, the downlink data size received in step S1608, the MN may decide to initiate the EDT procedure for the DL data.

In step S1609, the MN may send the Paging message containing the EDT indication for SN.

According to some embodiments of the present disclosure, steps S1607-S1609 may be needed only in case of DL data.

In step S1610, when the UE is being paged with the EDT indication for SN or when new data arrives in the uplink buffer, the UE may initiate the RACH procedure for EDT.

In step S1611, the UE may resume the connection by sending an RRC Resume Request message or new message to MN. The UE may include I-RNTI of the UE, the RRC resume cause, and authentication token (for example, Resume MAC-I).

When the UE is being paged with the EDT indication for SN, the UE may also include AS-Release Assistance information (e.g., by using BSR, MAC CE) for data towards the SN in a message to the SN.

For example, the AS-RAS may indicate (1) no further Uplink and Downlink Data transmission towards SN, or (2) only a single Downlink Data transmission subsequent to the Uplink transmission towards SN.

If the UE has the pending UL data, the UL data may be also transmitted on DTCH multiplexed with this message on CCCH.

In step S1612, on receiving the message from the UE, the MN may first check whether it is able to find the UE context or not. Based on the RAI from the UE, the data size, and/or the traffic pattern in subscription information from 5GC, the MN may decide whether to continue the EDT procedure for the frequent small data transmission (for example, single PDCP PDUs in uplink and/or single PDCP PDUs in downlink) or to transit to the RRC-CONNECTED state.

In step S1613, if there is the UL data received from the UE in step S1612, the MN may send the UL data to 5GC via the SN.

In step S1614, the MN may send the RRC Release message to the UE. The DL data may be sent ciphered on DTCH multiplexed with the RRC Release message or new message on DCCH.

According to the procedure in FIGS. 16A and 16B, the MN needs not to re-establish or resume the lower layers at SN to forward the small data, thus resulting in no UE's state transition to RRC-CONNECTED. Compared with the procedure in FIGS. 15A and 15B, this solution need not to trigger the Activity Notification procedure by the SN to notify the MN about user data activity for SN terminated bearers. Since the DL data is sent to the MN via the SN, the small data can be more quickly forwarded to the UE for DL or 5GC for UL than the procedure in FIGS. 15A and 15B.

Hereinafter, an apparatus for small data transmission in RRC inactive state in MR-DC in a wireless communication system, according to some embodiments of the present disclosure, will be described.

According to some embodiments of the present disclosure, a Master Node (MN) may establish a Dual Connectivity (DC) for a wireless device with a Secondary Node (SN) in a wireless communication. For example, a Master Node (MN) may include a processor, a transceiver, and a memory.

For example, the processor may be configured to be coupled operably with the memory and the processor.

The processor may be configured to suspend a Radio Resource Control (RRC) connection with the wireless device. The processor may be configured to receive, from a Secondary Node (SN) in the DC, a first message related to a downlink (DL) data. The processor may be configured to control the transceiver to transmit, to the wireless device, a paging message including an indication related to an Early Data Transmission (EDT) procedure for the SN. The processor may be configured to control the transceiver to receive, from the wireless device, an Access Stratum-Release Assistance Information (AS-RAI) related to the EDT procedure for SN. The processor may be configured to decide whether to continue the EDT procedure to the wireless device for the DL data or to transit the wireless device to the RRC-CONNECTED state based on the received AS-RAI. The processor may be configured to control the transceiver to transmit the DL data to the wireless device based on the decision.

According to some embodiments of the present disclosure, the first message may include a size of the DL data.

For example, the first message may include a request for the EDT procedure for the DL data.

For example, the processor may be configured to transmit, to the SN, a transport block size (TBS) before receiving the first message. For example, the size of the DL data may be included in the first message, based on that the size of the DL data is less than or equal to the TBS.

For example, the decision, whether to continue the EDT procedure to the wireless device for the DL data or to transit the wireless device to the RRC-CONNECTED state, may be further based on the size of the DL data.

For example, the processor may be configured to transmit, to the SN, a second message to request the DL data upon deciding to continue the EDT procedure to the wireless device for the DL data. The processor may be configured to receive, from the SN, the DL data.

For example, the processor may be configured to control the transceiver to transmit, to the wireless device, an RRC release message and the DL data in the EDT procedure.

According to some embodiments of the present disclosure, the first message may include the DL data.

For example, the processor may be configured to transmit, to the SN, a transport block size (TBS) before receiving the first message. For example, the DL data may be transmitted, based on that a size of the DL data is less than or equal to the TBS.

For example, the processor may be configured to control the transceiver to transmit, to the wireless device, an RRC release message and the DL data in the EDT procedure, upon deciding to continue the EDT procedure to the wireless device for the DL data.

According to some embodiments of the present disclosure, the processor may be configured to check whether a UE context for the wireless device is stored or not.

For example, the decision, whether to continue the EDT procedure to the wireless device for the DL data or to transit the wireless device to the RRC-CONNECTED state, may be performed based on that the UE context for the wireless device is stored in the MN.

According to some embodiments of the present disclosure, the processor may be configured to receive, from a core network node, a subscription information including a traffic pattern.

For example, the decision, whether to continue the EDT procedure to the wireless device for the DL data or to transit the wireless device to the RRC-CONNECTED state, may be further based on the traffic pattern included in the subscription information.

According to some embodiments of the present disclosure, the AS-RAI may inform that (1) no further (Uplink) UL data transmission and/or DL data transmission for the wireless device from the SN is expected, or (2) only a single DL data transmission for the wireless device from the SN is expected.

According to some embodiments of the present disclosure, the AS-RAI may be included in a Medium Access Control (MAC)-Control Element (CE).

According to some embodiments of the present disclosure, the AS-RAI may be included in an RRC resume request message.

Hereinafter, a processor for a Master Node (MN) for small data transmission in RRC inactive state in MR-DC in a wireless communication system, according to some embodiments of the present disclosure, will be described.

For example the MN may be establish the MR-DC with a Secondary Node (SN) for a wireless device.

The processor may be configured to control the MN to suspend a Radio Resource Control (RRC) connection with the wireless device. The processor may be configured to control the MN to receive, from a Secondary Node (SN) in the DC, a first message related to a downlink (DL) data. The processor may be configured to control the MN to transmit, to the wireless device, a paging message including an indication related to an Early Data Transmission (EDT) procedure for the SN. The processor may be configured to control the MN to receive, from the wireless device, an Access Stratum-Release Assistance Information (AS-RAI) related to the EDT procedure for SN. The processor may be configured to control the MN to decide whether to continue the EDT procedure to the wireless device for the DL data or to transit the wireless device to the RRC-CONNECTED state based on the received AS-RAI. The processor may be configured to control the MN to transmit the DL data to the wireless device based on the decision.

According to some embodiments of the present disclosure, the first message may include a size of the DL data.

For example, the first message may include a request for the EDT procedure for the DL data.

For example, the processor may be configured to control the MN to transmit, to the SN, a transport block size (TBS) before receiving the first message. For example, the size of the DL data may be included in the first message, based on that the size of the DL data is less than or equal to the TBS.

For example, the decision, whether to continue the EDT procedure to the wireless device for the DL data or to transit the wireless device to the RRC-CONNECTED state, may be further based on the size of the DL data.

For example, the processor may be configured to control the MN to transmit, to the SN, a second message to request the DL data upon deciding to continue the EDT procedure to the wireless device for the DL data. The processor may be configured to control the MN to receive, from the SN, the DL data.

For example, the processor may be configured to control the MN to transmit, to the wireless device, an RRC release message and the DL data in the EDT procedure.

According to some embodiments of the present disclosure, the first message may include the DL data.

For example, the processor may be configured to control the MN to transmit, to the SN, a transport block size (TBS) before receiving the first message. For example, the DL data may be transmitted, based on that a size of the DL data is less than or equal to the TBS.

For example, the processor may be configured to control the MN to transmit, to the wireless device, an RRC release message and the DL data in the EDT procedure, upon deciding to continue the EDT procedure to the wireless device for the DL data.

According to some embodiments of the present disclosure, the processor may be configured to control the MN to check whether a UE context for the wireless device is stored or not.

For example, the decision, whether to continue the EDT procedure to the wireless device for the DL data or to transit the wireless device to the RRC-CONNECTED state, may be performed based on that the UE context for the wireless device is stored in the MN.

According to some embodiments of the present disclosure, the processor may be configured to control the MN to receive, from a core network node, a subscription information including a traffic pattern.

For example, the decision, whether to continue the EDT procedure to the wireless device for the DL data or to transit the wireless device to the RRC-CONNECTED state, may be further based on the traffic pattern included in the subscription information.

According to some embodiments of the present disclosure, the AS-RAI may inform that (1) no further (Uplink) UL data transmission and/or DL data transmission for the wireless device from the SN is expected, or (2) only a single DL data transmission for the wireless device from the SN is expected.

According to some embodiments of the present disclosure, the AS-RAI may be included in a Medium Access Control (MAC)-Control Element (CE).

According to some embodiments of the present disclosure, the AS-RAI may be included in an RRC resume request message.

Hereinafter, a non-transitory computer-readable medium has stored thereon a plurality of instructions for small data transmission in RRC inactive state in MR-DC in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a Master Node (MN) in a Dual Connectivity (DC) for a wireless device.

The stored a plurality of instructions may cause the MN to suspend a Radio Resource Control (RRC) connection with the wireless device. The stored a plurality of instructions may cause the MN to receive, from a Secondary Node (SN) in the DC, a first message related to a downlink (DL) data. The stored a plurality of instructions may cause the MN to transmit, to the wireless device, a paging message including an indication related to an Early Data Transmission (EDT) procedure for the SN. The stored a plurality of instructions may cause the MN to receive, from the wireless device, an Access Stratum-Release Assistance Information (AS-RAI) related to the EDT procedure for SN. The stored a plurality of instructions may cause the MN to decide whether to continue the EDT procedure to the wireless device for the DL data or to transit the wireless device to the RRC-CONNECTED state based on the received AS-RAI.

The stored a plurality of instructions may cause the MN to transmit the DL data to the wireless device based on the decision.

According to some embodiments of the present disclosure, the first message may include a size of the DL data.

For example, the first message may include a request for the EDT procedure for the DL data.

For example, the stored a plurality of instructions may cause the MN to transmit, to the SN, a transport block size (TBS) before receiving the first message. For example, the size of the DL data may be included in the first message, based on that the size of the DL data is less than or equal to the TBS.

For example, the decision, whether to continue the EDT procedure to the wireless device for the DL data or to transit the wireless device to the RRC-CONNECTED state, may be further based on the size of the DL data.

For example, the stored a plurality of instructions may cause the MN to transmit, to the SN, a second message to request the DL data upon deciding to continue the EDT procedure to the wireless device for the DL data. The stored a plurality of instructions may cause the MN to receive, from the SN, the DL data.

For example, the stored a plurality of instructions may cause the MN to transmit, to the wireless device, an RRC release message and the DL data in the EDT procedure.

According to some embodiments of the present disclosure, the first message may include the DL data.

For example, the stored a plurality of instructions may cause the MN to transmit, to the SN, a transport block size (TBS) before receiving the first message. For example, the DL data may be transmitted, based on that a size of the DL data is less than or equal to the TBS.

For example, the stored a plurality of instructions may cause the MN to transmit, to the wireless device, an RRC release message and the DL data in the EDT procedure, upon deciding to continue the EDT procedure to the wireless device for the DL data.

According to some embodiments of the present disclosure, the stored a plurality of instructions may cause the MN to check whether a UE context for the wireless device is stored or not.

For example, the decision, whether to continue the EDT procedure to the wireless device for the DL data or to transit the wireless device to the RRC-CONNECTED state, may be performed based on that the UE context for the wireless device is stored in the MN.

According to some embodiments of the present disclosure, the stored a plurality of instructions may cause the MN to receive, from a core network node, a subscription information including a traffic pattern.

For example, the decision, whether to continue the EDT procedure to the wireless device for the DL data or to transit the wireless device to the RRC-CONNECTED state, may be further based on the traffic pattern included in the subscription information.

According to some embodiments of the present disclosure, the AS-RAI may inform that (1) no further (Uplink) UL data transmission and/or DL data transmission for the wireless device from the SN is expected, or (2) only a single DL data transmission for the wireless device from the SN is expected.

According to some embodiments of the present disclosure, the AS-RAI may be included in a Medium Access Control (MAC)-Control Element (CE).

According to some embodiments of the present disclosure, the AS-RAI may be included in an RRC resume request message.

The present disclosure may have various advantageous effects.

According to some embodiments of the present disclosure, a master node (MN) and a secondary node (SN) could efficiently perform small data transmission in RRC inactive state in MR-DC.

According to some embodiments of the present disclosure, since the MN needs not to re-establish or resume the lower layers at SN to forward the small data, the wireless device may not need to perform state transition to RRC-CONNECTED state.

For example, the small data can be quickly forwarded to the wireless device for Downlink (DL) or 5GC for Uplink (UL).

According to some embodiments of the present disclosure, the MN needs not to re-establish or resume the lower layers at SN to forward the small data, thus resulting in no UE's state transition to RRC-CONNECTED.

For example, it may need not to trigger the Activity Notification procedure by the SN to notify the MN about user data activity for SN terminated bearers. Since the DL data is sent to the MN via the SN, the small data can be quickly forwarded to a wireless device for DL or 5GC for UL.

According to some embodiments of the present disclosure, a wireless communication system could provide an efficient solution for small data transmission in RRC inactive state in MR-DC.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a Master Node (MN) in a Dual Connectivity (DC) for a wireless device in a wireless communication system, the method comprising,
    suspending a Radio Resource Control (RRC) connection with the wireless device;
    receiving, from a Secondary Node (SN) in the DC, a first message related to a downlink (DL) data;
    transmitting, to the wireless device, a paging message including an indication related to an Early Data Transmission (EDT) procedure for the SN;
    receiving, from the wireless device, an Access Stratum-Release Assistance Information (AS-RAI) related to the EDT procedure for SN;

deciding whether to continue the EDT procedure to the wireless device for the DL data or to transit the wireless device to the RRC-CONNECTED state based on the received AS-RAI; and transmitting the DL data to the wireless device based on the decision.

2. The method of claim 1, wherein the first message includes a size of the DL data.

3. The method of claim 2, wherein the first message includes a request for the EDT procedure for the DL data.

4. The method of claim 2, wherein the method further comprises, transmitting, to the SN, a transport block size (TBS) before receiving the first message, wherein the size of the DL data is included in the first message, based on that the size of the DL data is less than or equal to the TBS.

5. The method of claim 2, wherein the decision, whether to continue the EDT procedure to the wireless device for the DL data or to transit the wireless device to the RRC-CONNECTED state, is further based on the size of the DL data.

6. The method of claim 2, wherein the method further comprises, transmitting, to the SN, a second message to request the DL data upon deciding to continue the EDT procedure to the wireless device for the DL data; and receiving, from the SN, the DL data.

7. The method of claim 6, wherein the method further comprises, transmitting, to the wireless device, an RRC release message and the DL data in the EDT procedure.

8. The method of claim 1, wherein the first message includes the DL data.

9. The method of claim 8, wherein the method further comprises, transmitting, to the SN, a transport block size (TBS) before receiving the first message, wherein the DL data is transmitted, based on that a size of the DL data is less than or equal to the TBS.

10. The method of claim 8, wherein the method further comprises, transmitting, to the wireless device, an RRC release message and the DL data in the EDT procedure, upon deciding to continue the EDT procedure to the wireless device for the DL data.

11. The method of claim 1, wherein the method further comprises, checking whether a UE context for the wireless device is stored or not, wherein the decision, whether to continue the EDT procedure to the wireless device for the DL data or to transit the wireless device to the RRC-CONNECTED state, is performed based on that the UE context for the wireless device is stored in the MN.

12. The method of claim 1, wherein the method further comprises, receiving, from a core network node, a subscription information including a traffic pattern, wherein the decision, whether to continue the EDT procedure to the wireless device for the DL data or to transit the wireless device to the RRC-CONNECTED state, is further based on the traffic pattern included in the subscription information.

13. The method of claim 1, wherein the AS-RAI informs that (1) no further (Uplink) UL data transmission and/or DL data transmission for the wireless device from the SN is expected, or (2) only a single DL data transmission for the wireless device from the SN is expected.

14. The method of claim 1, wherein the AS-RAI is included in a Medium Access Control (MAC)-Control Element (CE).

15. The method of claim 1, wherein the AS-RAI is included in an RRC resume request message.

16. A Master Node (MN) in a Dual Connectivity (DC) for a wireless device in a wireless communication system comprising:

a memory;

a transceiver; and at least one processor operatively coupled to the memory and the transceiver, and configured to:

suspend a Radio Resource Control (RRC) connection with the wireless device;

receive, from a Secondary Node (SN) in the DC, a first message related to a downlink (DL) data;

control the transceiver to transmit, to the wireless device, a paging message including an indication related to an Early Data Transmission (EDT) procedure for the SN;

control the transceiver to receive, from the wireless device, an Access Stratum-Release Assistance Information (AS-RAI) related to the EDT procedure for SN;

decide whether to continue the EDT procedure to the wireless device for the DL data or to transit the wireless device to the RRC-CONNECTED state based on the received AS-RAI; and control the transceiver to transmit the DL data to the wireless device based on the decision.

17. The MN of claim 16, wherein the first message includes a size of the DL data.

18. The MN of claim 17, wherein the first message includes a request for the EDT procedure for the DL data.

19. The MN of claim 17, wherein the at least one processor is further configured to, transmit, to the SN, a transport block size (TBS) before receiving the first message, wherein the size of the DL data is included in the first message, based on that the size of the DL data is less than or equal to the TBS.

20. A non-transitory computer-readable medium having stored thereon a plurality of instructions, which, when executed by a processor of a Master Node (MN) in a Dual Connectivity (DC) for a wireless device in a wireless communication system, cause the MN to:

suspend a Radio Resource Control (RRC) connection with the wireless device;

receive, from a Secondary Node (SN) in the DC, a first message related to a downlink (DL) data;

transmit, to the wireless device, a paging message including an indication related to an Early Data Transmission (EDT) procedure for the SN;

receive, from the wireless device, an Access Stratum-Release Assistance Information (AS-RAI) related to the EDT procedure for SN;

decide whether to continue the EDT procedure to the wireless device for the DL data or to transit the wireless device to the RRC-CONNECTED state based on the received AS-RAI; and transmit the DL data to the wireless device based on the decision.

* * * * *